(12) United States Patent
Edwards

(10) Patent No.: US 11,910,829 B1
(45) Date of Patent: Feb. 27, 2024

(54) ELECTRONIC CIGARETTE AND CARTRIDGE UNIT

(71) Applicant: Podz Lyfe INC., Oceanside, CA (US)

(72) Inventor: Stanton Edwards, Oceanside, CA (US)

(73) Assignee: Podz Lyfe INC., Oceanside, CA (US)

( * ) Notice: Subject to any disclaimer, the term of this patent is extended or adjusted under 35 U.S.C. 154(b) by 770 days.

(21) Appl. No.: 16/859,966

(22) Filed: Apr. 27, 2020

Related U.S. Application Data

(60) Provisional application No. 62/839,598, filed on Apr. 26, 2019.

(51) Int. Cl.
| | |
|---|---|
| A24F 47/00 | (2020.01) |
| A24F 40/42 | (2020.01) |
| A24F 40/70 | (2020.01) |
| C08L 101/16 | (2006.01) |
| C08L 67/04 | (2006.01) |
| A24F 40/10 | (2020.01) |
| A24F 40/40 | (2020.01) |
| A24F 40/44 | (2020.01) |
| A24F 40/465 | (2020.01) |

(52) U.S. Cl.
CPC .............. *A24F 40/42* (2020.01); *A24F 40/10* (2020.01); *A24F 40/40* (2020.01); *A24F 40/44* (2020.01); *A24F 40/465* (2020.01); *A24F 40/70* (2020.01); *C08L 67/04* (2013.01); *C08L 101/16* (2013.01); *C08L 2201/06* (2013.01)

(58) Field of Classification Search
CPC .......... A24F 40/40; A24F 40/42; A24F 40/46; A24F 40/70
See application file for complete search history.

(56) References Cited

U.S. PATENT DOCUMENTS

| | | | |
|---|---|---|---|
| 10,058,129 B2 | 8/2018 | Monsees et al. | |
| 10,104,915 B2 | 10/2018 | Bowen et al. | |
| 10,111,470 B2 | 10/2018 | Monsees et al. | |
| 10,117,465 B2 | 11/2018 | Monsees et al. | |
| 10,117,466 B2 | 11/2018 | Monsees et al. | |
| 2013/0192622 A1* | 8/2013 | Tucker | H05B 3/12 131/329 |
| 2014/0283859 A1* | 9/2014 | Minskoff | A24F 40/485 131/329 |
| 2016/0310684 A1* | 10/2016 | McCullough | A24F 40/70 |
| 2018/0325172 A1* | 11/2018 | Zhu | A24F 40/46 |
| 2019/0289909 A1* | 9/2019 | Hejazi | A61M 15/0031 |
| 2020/0000145 A1* | 1/2020 | Selby | A61M 15/06 |
| 2020/0245680 A1* | 8/2020 | Williams | A61M 11/042 |
| 2021/0045450 A1* | 2/2021 | Lomas | A24F 40/10 |
| 2021/0112864 A1* | 4/2021 | Garcia Garcia | A24F 1/26 |

\* cited by examiner

*Primary Examiner* — Eric Yaary
(74) *Attorney, Agent, or Firm* — Torrey Pines Law Group, PC

(57) ABSTRACT

An environmentally friendly cartridge of an electronic cigarette unit whose mouthpiece is composed of a bioplastic and is antimicrobial is described herein. The cartridge, described as a cartridge unit, connects to a battery and electrical component casing to form an electronic cigarette.

3 Claims, 24 Drawing Sheets

ELECTRONIC CIGARETTE AND CARTRIDGE UNIT

CROSS-REFERENCE TO RELATED APPLICATIONS

This application claims priority from U.S. Provisional Application Ser. No. 62/839,598 filed on Apr. 26, 2019, which is incorporated herein by reference in its entirety.

STATEMENT REGARDING FEDERALLY SPONSORED RESEARCH OR DEVELOPMENT

Not Applicable.

FIELD

The present teachings relate to an electronic cigarette and corresponding disposable cartridge.

INTRODUCTION

Electronic cigarettes contain disposable cartridge units that are not sustainably refillable. The consumer has a onetime use of the product and must discard of the empty product.

Current disposable cartridge units are only set for one vaporization temperature from a single option vaporization core. This restricts the consumer to only vaporizing one solution due to vaporization temperature. Additionally, it does not allow the consumer to customize the vaporization method with alternative heating methods. This also restricts the manufacturer to a complete redesign of their product when alternative technology improves and the manufacturer wants to substitute a new heating method.

Current disposable cartridge units are plugged into a battery and electrical component casing to form an electronic cigarette. The smooth body lines and texture of the battery casing are continued to the cartridge unit. This creates a nearly seamless visual and tactile transition between the two pieces within the electronic cigarette.

Current disposable cartridge units contain mouthpieces, tanks, a vaporizer, and a cap which are text-free, and devoid of symbols and other identifying features. Current cartridge casings are color-coded per its respective flavor and are attached to the non-color coded cartridge unit to create a cartridge package. A consumer can purchase multiple flavors for their electronic cigarette and keep a few different flavored cartridge packages in their pocket to switch in and out of their electronic cigarette as they desire. Often times the cartridge casings are inadvertently switched to a cartridge unit that does not correspond to the respective color-coded flavor. The current color-coding system allows for a consumer to inadvertently use a product flavor that was not desired at the time.

Current electronic cigarette cartridges have only one designed in airflow setting which is built into the cartridge itself. Each user is unique and inhales at a different pressure. The product is not adjustable to fit the needs and requirements of the user. The current products require the consumer to adjust their draw upon the cartridge instead of the cartridge adjusting to the consumer.

Electronic cigarettes can be passed between users, dropped on to a contaminated surface such as floor, or placed on to a tabletop surface where microorganisms can be transferred from the contaminated surface to the mouthpiece of the electronic cigarette. These microorganisms can then be orally transferred to the user upon use of the product.

The used and empty cartridges and mouthpieces are the new "cigarette butts" of society and these items are littering various locations such as streets, beaches, parks, and campuses. The current chemical composition does not allow these plastics to biodegrade and the used product remains wherever it was discarded. If the discarded cartridge and mouthpiece are properly disposed of, they are generally sent to landfills, with a minority portion of the discarded waste sent to be recycled. Current electronic cigarette manufacturing companies do not utilize biodegradable and compostable resin fillers or bioplastics used in other industries which could allow the used cartridge and mouthpiece to break down from its solid-state form to a state safe for the environment regardless of its final location.

Vaporizers after continual use can char or smolder the liquid solution being vaporized. This is due to uneven heat distribution from the heat produced from the coil to the solution being vaporized. This causes the vapor to be contaminated with burnt particles which can reveals itself through taste to the consumer upon drawing vapor from their electronic cigarette.

Current disposable cartridge units are only set for one vaporization temperature from a single option vaporization core. This restricts the consumer to only vaporizing one solution due to vaporization temperature. Additionally, it does not allow the consumer to customize the vaporization method with alternative heating methods.

SUMMARY

The present teachings are directed to an apparatus for vaping. The apparatus comprises a cartridge unit and a battery and electrical component casing that connects to the cartridge unit. The cartridge unit is comprised of a mouthpiece, an airflow insert gate, a fabric insert, a cap, a top cap seal, a top tube seal, a vaporizer unit, a tank, and a side seal. A battery and electrical component casing attaches to the cartridge unit. The mouthpiece is for inhaling the vapor emanating from the tank. The airflow insert gate, on a side surface of the mouthpiece. A fabric insert is positioned within the mouthpiece, with a cap resting near the end of the mouthpiece a user does not inhale from, yet they protect the cartridge unit during transportation. A top cap seal from cap to tank rests on the ridge of the cap. A top tube seal from tube to cap encircles a tube, the tube of which is a component of the vaporizer unit. The vaporizer unit is housed within the tank, and a side seal, on the front face of the tank, may swing outward when the cartridge unit is not in use. The cartridge unit fits into the inner surface of the battery and electrical component casing.

In accordance with a further aspect, the mouthpiece is made of an antimicrobial material and/or contains an antimicrobial film. The material is meant for minimizing bacterial and viral growth on the mouthpiece, since the mouthpiece comes in contact with a user's mouth.

In accordance with yet a further aspect, the mouthpiece is made of a bioplastic. Bioplastics have the benefit of being environmentally friendly by being made from renewable materials and, in some instances, by being biodegradable and compostable.

In accordance with yet a further aspect, the material by which the mouthpiece may be made from to make it antimicrobial varies widely. Examples of such materials include, but are not limited to, metals, essential oils, natural compounds, peptides, antibiotics, chelating agents, chitosan, other polymers, bioactive polymers, biopassive polymers, enzymes, silica, nisin, polyhexamethylene guanidine hydrochloride, starch, Ethyl-Na-dodecanoyl-L-arginate, caseinates, nanofillers, ethyl cellulose, and combinations of these materials.

In accordance with yet a further aspect, similar to the antimicrobial material, the bioplastic material that the mouthpiece is made from varies. Such materials include, but are not limited to, polylactic acid (PLA), high temperature polylactic acid (HTPLA), furandicarbonylic acid (FDCA), polyhydroxyalkanaoates (PHA), polyhydroxybutyrate (PHB), poly-3-hydroxybutyrate (P3HB), poly-4-hydroxybutyrate (P4HB), polyhydroxyvalerate (PHV), polyhydroxyhexanoate (PHH), polyhydroxyoctanoate (PHO), other copolymers and monomers of PHA, polybutylene succinate (PBS), polyethylene succinate (PES), polypropiolactone (PPL), polypropiolactone high molecular weight (PPL-HMW), polycaprolactone (PCL), polyethylene adipate (PEA), polyethylene azelate (PEAz), polyethylene suberate (PEsu), polyethylene sebacate (PESE), polyethylene decamethylate (PEDe), polybutylene adipate (PBA), aliphatic-aromatic copolyesters (AAC), acetyl cellulose (AcC), starch-based plastics, cellulose-based plastics, protein-based plastics, and combinations of all these materials.

In accordance with yet a further aspect, the mouthpiece may be made of a biodegradable material. Of the previously mentioned bioplastic, some are biodegradable, while others are not.

In accordance with yet a further aspect, the mouthpiece may also be made of compostable materials. Some of the bioplastics are compostable, while others are not.

In accordance with yet a further aspect, the vaporizer unit is further comprised of a tube, a housing unit, a coil casing, a wick, a coil, and an electrode. The tube inserts into the housing unit, which houses the coil casing, wick, and coil. The coil encircles the wick, and the coil/wick combination is encased in the coil casing. The electrode typically exists as a pair, with each electrode on either side of the housing unit.

In accordance with yet a further aspect, the coil casing may have different configurations. With the slotted features configuration, there are slots on the outer surface of the coil casing. The wrap feature encases the coil along its axis. The circular features configurations have circles imprinted on the outer surface of the coil casing. The internal fins feature fins on the inner surface of the coil casing, while the external fins configuration showcase fins on outer surface of the coil casing.

In accordance with yet a further aspect, the coil may have several configurations, too. The spiral coil design is the standard type of coil. The single strand coil and cluster strand coil are more novel and have the benefit of improved heat transfer analysis and vaporization of the liquid solution.

In accordance with yet a further aspect, a cartridge casing may connect with the cartridge unit when the cartridge unit is not connected to the battery and electrical component casing. In effect, the cartridge unit initially comes with the casing. When the user is ready to use the cartridge unit, the user removes the casing and connects the cartridge unit to the battery and electrical component casing.

In accordance with yet a further aspect, liquid enters the cartridge unit once the side seal is swung outward into the open position. In the closed position, the side seal is swung back inward, becoming flush with the cartridge unit.

In accordance with yet a further aspect, the cartridge unit has a variable airflow gate inlet, variable in that it can be adjusted between multiple positions.

In accordance with yet a further aspect, the variable positions that the variable airflow gate inlet can be adjusted to are open, half open, and closed.

The present teachings also include another embodiment of the cartridge unit, comprising a mouthpiece, an upper gasket, a tube, a tank, and a modular insert. The upper gasket rest on the bottom end of the mouthpiece, with the tube being inserted through a hole in the upper gasket. The tank connects to the mouthpiece, with the modular insert being inserted into the bottom end of the tank.

In accordance with yet a further aspect, the modular insert is further comprised of a modular base, a lower gasket, a wick, a wire coil, and an electrode. The lower gasket rests on the surface of the modular base. The wire coil encircles the wick, and the coil/wick combination rests on the lower gasket. The electrode typically exists as a pair, with both electrodes inserted in the bottom surface of the modular base.

In accordance with yet a further aspect, the upper gasket has interlocking features for the mouthpiece and alignment features for the tube. The former is for connecting firmly with the mouthpiece, while the latter is for ensuring the tube is positioned correctly in the tank.

In accordance with yet a further aspect, the tank has a vaporization chamber, which is exposed to the vaporization originating from the modular insert.

In accordance with yet a further aspect, the tank has a tank reservoir for solution. Liquid poured into the cartridge unit resides in the tank reservoir.

In accordance with yet a further aspect, the tank has tank fill line indicators to show how much liquid is in the tank.

These and other features, aspects, and advantages of the present teachings will become better understood with reference to the following description, examples and appended claims.

DRAWINGS

Those of skill in the art will understand that the drawings, described below, are for illustrative purposes only. The drawings are not intended to limit the scope of the present teachings in any way.

Figure 18:
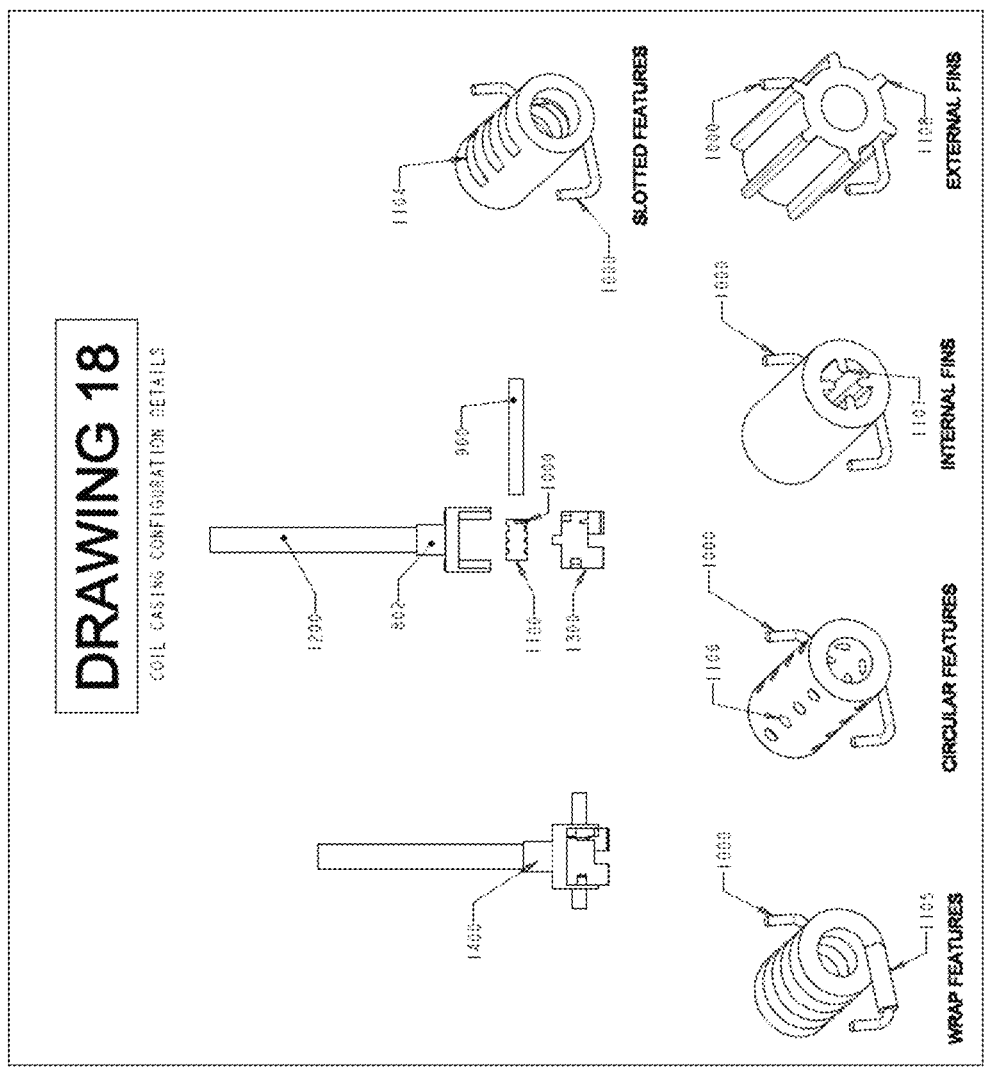

FIG. 18 shows the vaporizer assembly and the coil casing. There are 5 unique configurations to the coil casing design which are slotted features, wrap features, circular features, internal fins, and external fins. These configurations can be used individually or in combination with each other.

Figure 19:
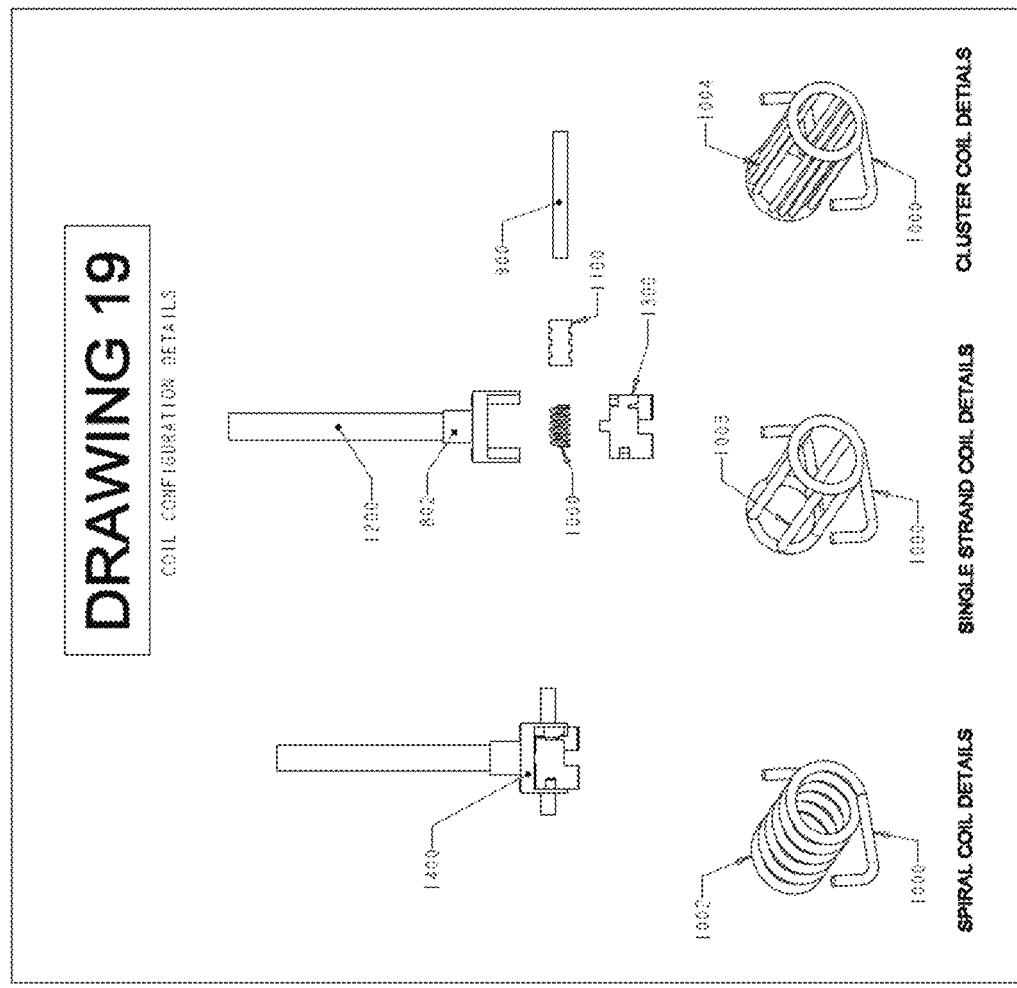

FIG. 19 shows the vaporizer assembly and the coil design and alternative configurations of the coil design.

Figure 20:
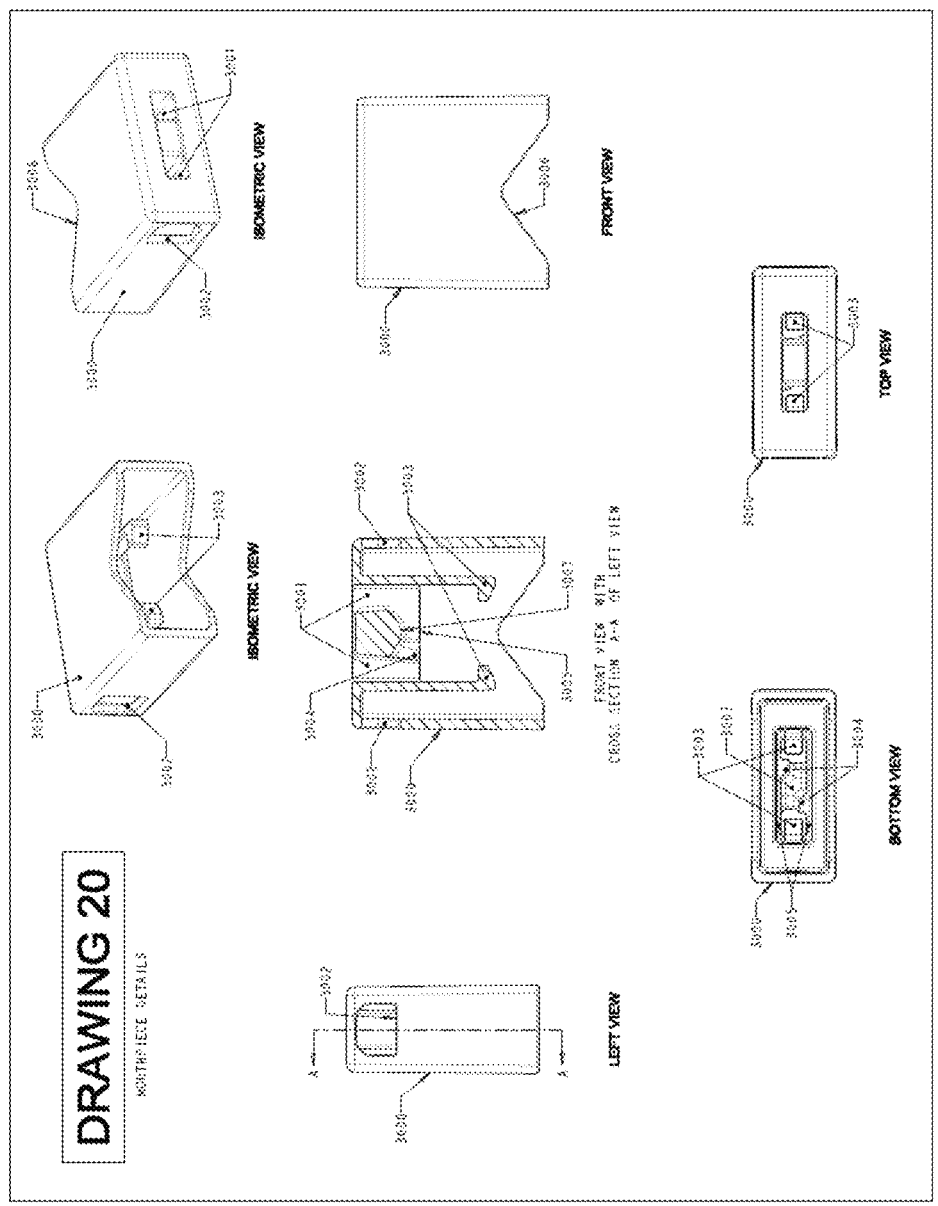

FIG. 20 shows the mouthpiece details and design features.

Figure 21:
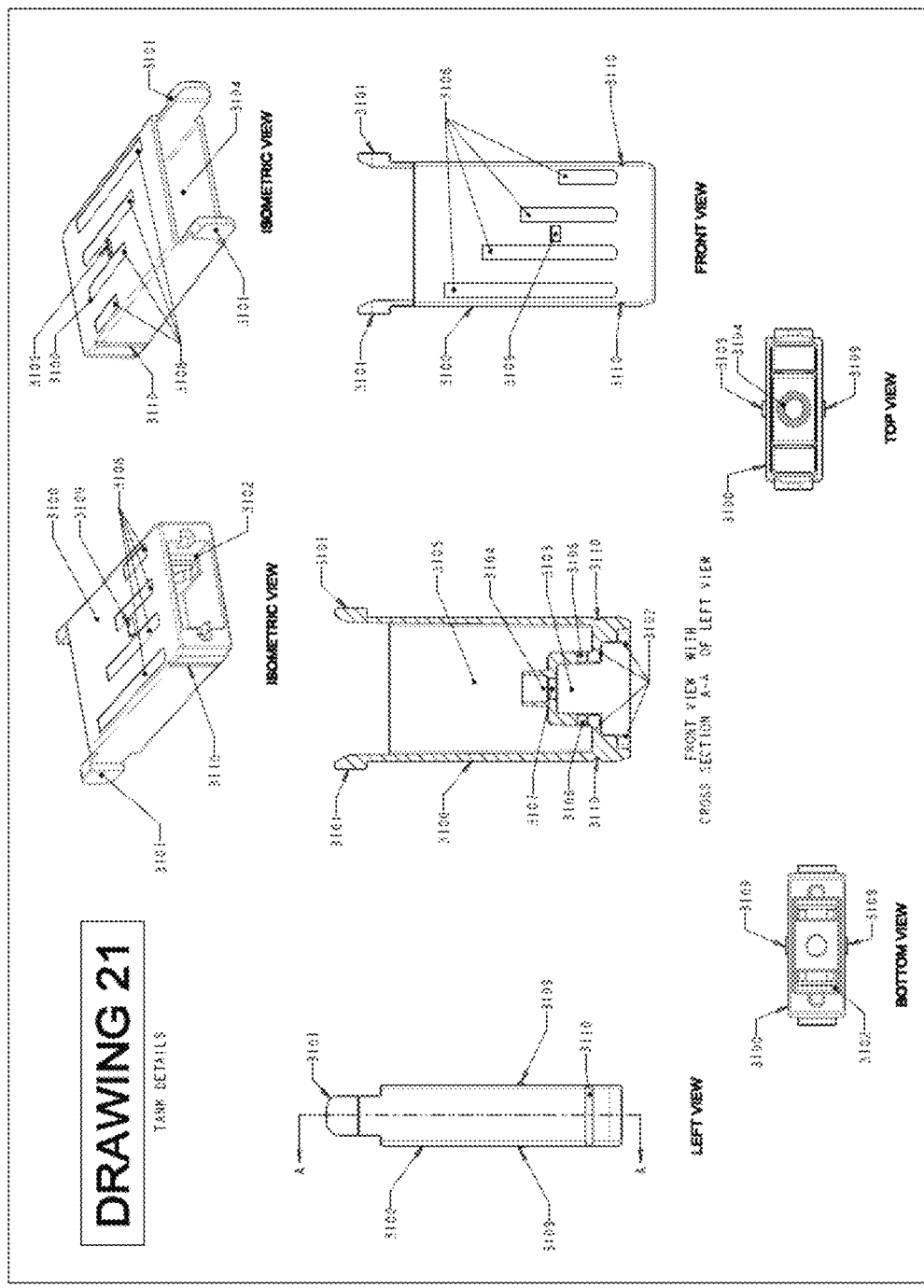

FIG. 21 shows the tank details and design features.

Figure 22:
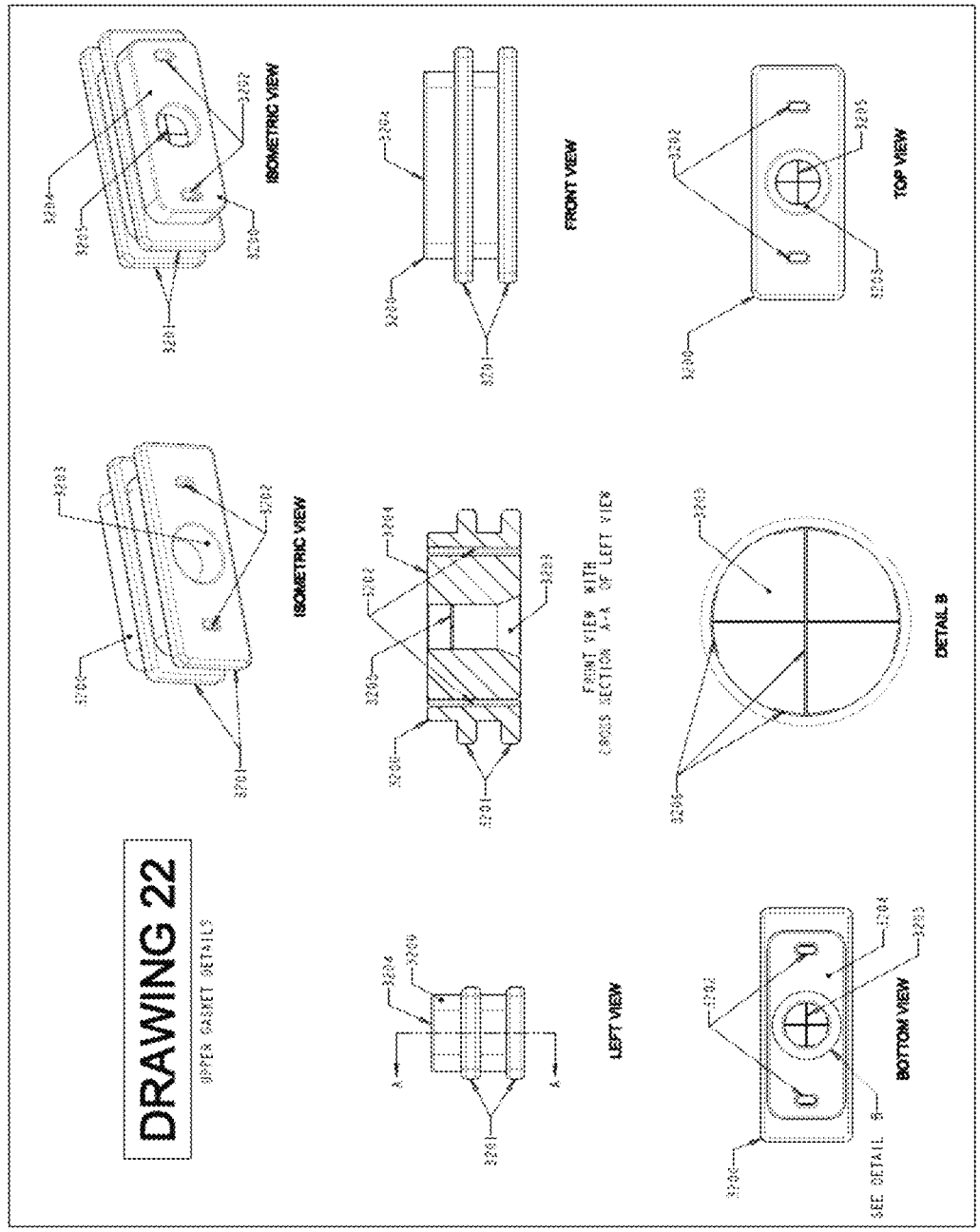

FIG. 22 shows the upper gasket details and design features.

Figure 23:
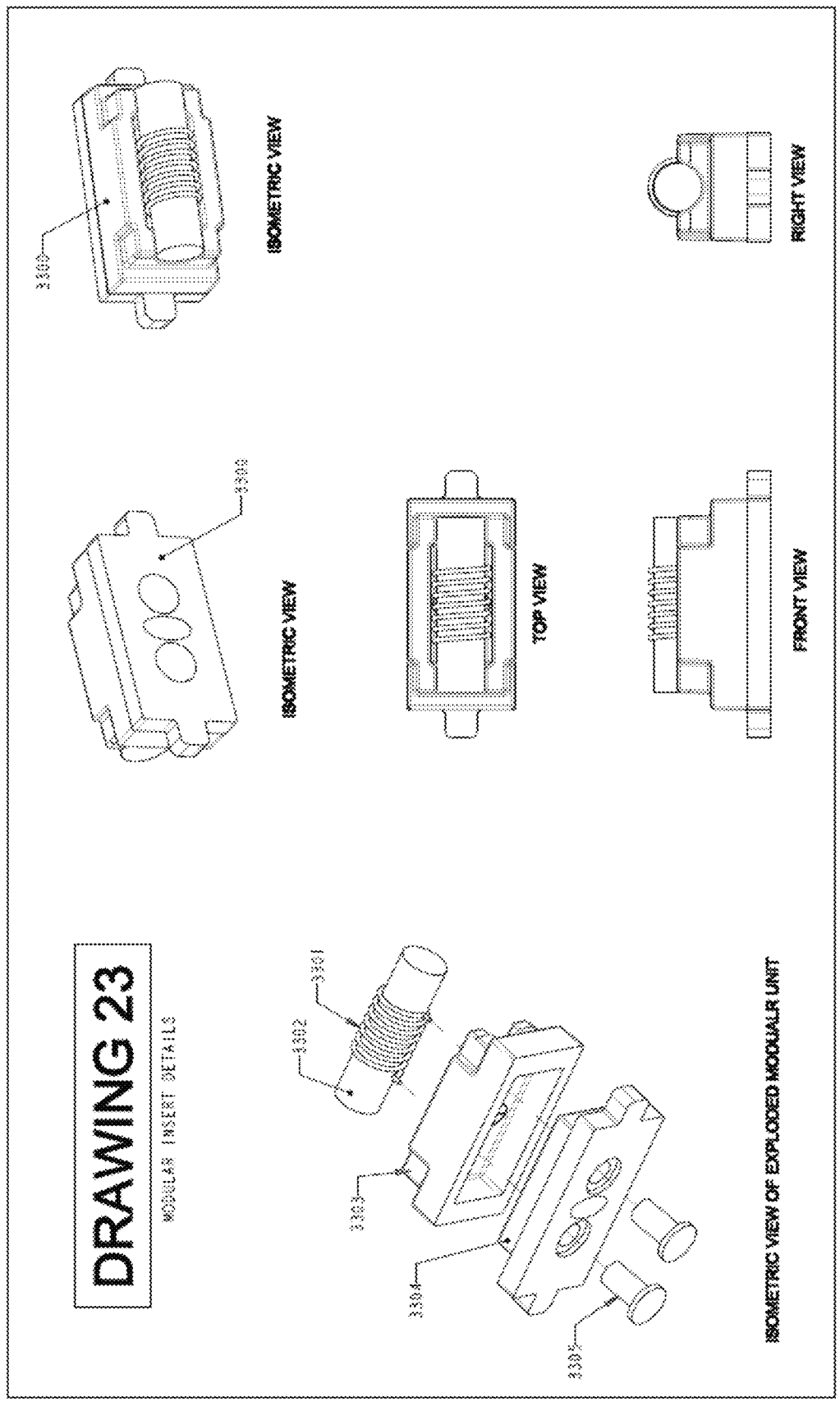

FIG. 23 shows the modular insert details, assembly, and subcomponents.

Figure 24:
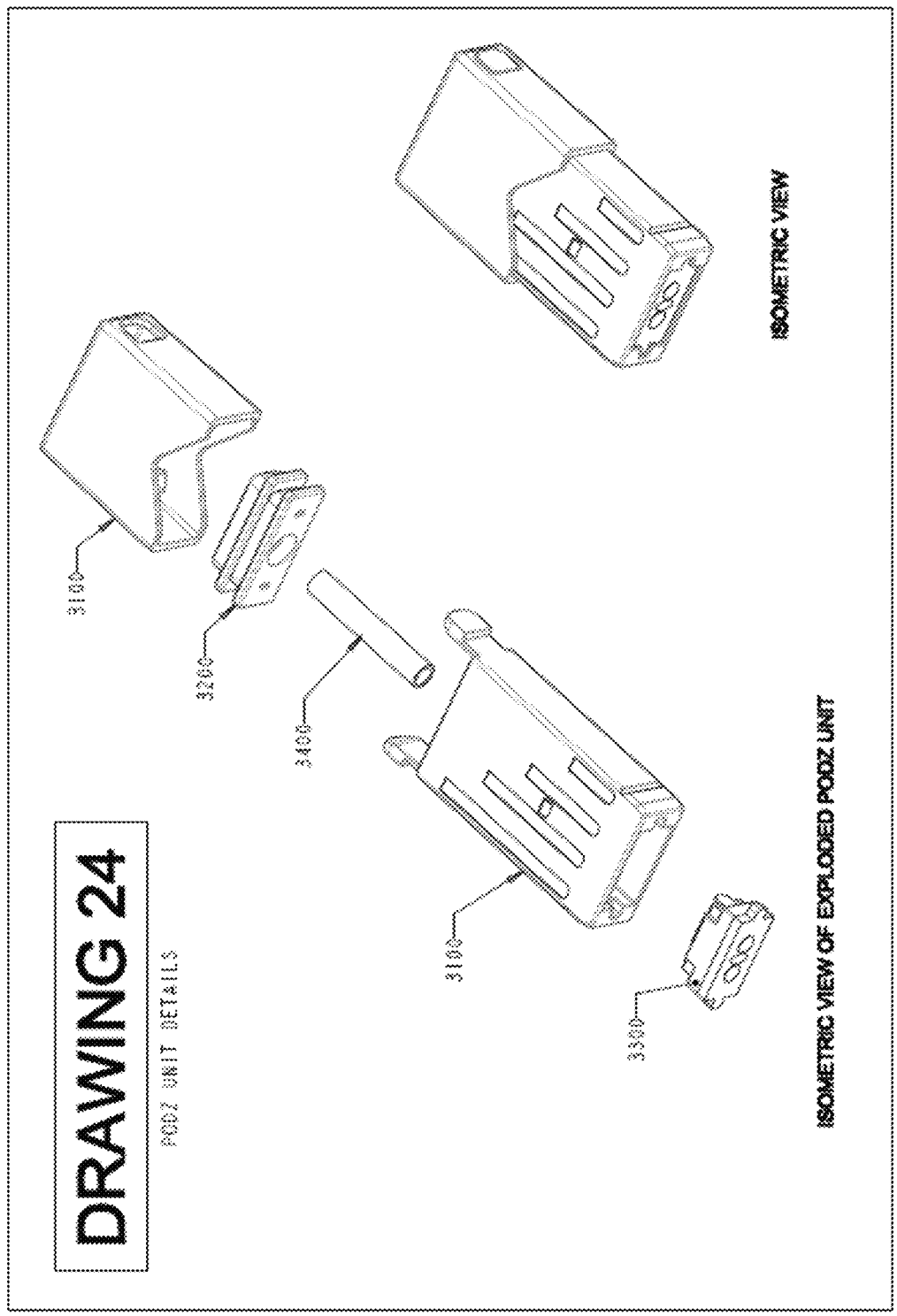

FIG. 24 shows the cartridge unit assembly details and subcomponents.

DETAILED DESCRIPTION

Abbreviations and Definitions

To facilitate understanding of the invention, a number of terms and abbreviations as used herein are defined below as follows:

Bioplastics: As used herein, the term "bioplastics" refers to materials that are fabricated from organic biomass and other renewable resources rather than petroleum.

Biodegradable plastics: As used herein, biodegradable plastics are a subset of bioplastics, although some bioplastics are not biodegradable. Biodegradable plastics are materials that undergo degradation resulting from the action of naturally occurring microorganisms such as bacteria, fungi, and algae. Examples of biodegradable plastics are polyhydroxyalkanoates, polylactic acid, starch blends, cellulose-based plastics, and lignin-based polymer composites.

Compostable plastics: As used herein, compostable plastics are materials that undergo degradation by biological processes to yield carbon dioxide, water, inorganic compounds and biomass and leaves no visible, distinguishable or toxic residue.

Antimicrobial material: As used herein, an antimicrobial material is one that inhibits the growth of microorganisms such as bacteria, fungi or protozoans.

Emboss: As used herein, emboss refers to carve, mold, or stamp a design on a surface or object so that it stands out in relief.

Drawing Identification Numbers

TABLE 1

| Item Number | Item Description |
|---|---|
| 100 | Mouthpiece |
| 101 | Mouthpiece tactile embossment |

TABLE 1-continued

| Item Number | Item Description |
|---|---|
| 102 | Mouthpiece label embossment information |
| 103 | Mouthpiece variable airflow gate inlet |
| 104 | Mouthpiece positional interlocking features for airflow gate insert |
| 105 | Mouthpiece interlocking features for tank |
| 106 | Mouthpiece interlocking features for tank |
| 107 | Mouthpiece retaining features for fabric insert |
| 108 | Mouthpiece retaining features for cap |
| 109 | Mouthpiece vapor exit channel |
| 110 | Mouthpiece variable position interlocking features for airflow gate insert |
| 111 | Mouthpiece landing feature for tank |
| 112 | Mouthpiece ambient airflow diverter |
| 113 | Mouthpiece vapor airflow diverter |
| 114 | Mouthpiece closed gate locking feature for airflow gate |
| 115 | Mouthpiece antimicrobial material |
| 116 | Mouthpiece biodegradable material |
| 117 | Mouthpiece emboss features for identification number for batch and quality |
| 200 | Tank |
| 201 | Tank top opening |
| 202 | Tank top interlocking feature for cap |
| 203 | Tank ambient airflow channel |
| 204 | Tank embossed label information |
| 205 | Tank embossed for liquid level indicator |
| 206 | Tank recess for side seal |
| 207 | Tank interlocking feature for side seal head |
| 208 | Tank interlocking feature for side seal tail |
| 209 | Tank interlocking feature for mouthpiece |
| 210 | Tank interlocking feature for mouthpiece |
| 211 | Tank interlocking feature for battery casing |
| 212 | Tank interlocking feature for pod casing |
| 213 | Tank interlocking feature for cap |
| 214 | Tank interlocking feature for housing |
| 215 | Tank ambient air inlet |
| 216 | Tank electrode pass through |
| 217 | Tank embossment for tactile continuity to battery casing and mouthpiece |
| 218 | Tank recess for ease of side seal head removal |
| 219 | Tank feature to position wick |
| 220 | Tank feature to support bending operation of electrode |
| 221 | Tank closed gate locking feature for airflow gate |
| 222 | Tank embossed features for identification number for batch and quality |
| 300 | Airflow gate insert |
| 301 | Airflow gate insert positional interlocking feature |
| 302 | Tab for manually adjusting position of airflow gate insert |
| 303 | Airflow gate closed gate locking feature with tank |
| 304 | Airflow gate embossed information |
| 305 | Airflow gate interlocking alignment feature to tank |
| 306 | Airflow gate interlocking alignment feature to mouthpiece |
| 307 | Airflow gate embossed features for identification number for batch and quality |
| 400 | Side seal |
| 401 | Side seal head |
| 402 | Side seal head alignment and ease of installation to tank features |
| 403 | Side seal head interlocking features with tank to prevent unwanted removal of seal |
| 404 | Side seal head interlocking features with tank to prevent over insertion of head into tank |
| 405 | Side seal head features for ease of head removal from tank |
| 406 | Side seal head features for compression of seal |
| 407 | Side seal body features |
| 408 | Side seal tail |
| 409 | Side seal tail alignment and ease of installation to tank features |
| 410 | Side seal tail interlocking features with tank to prevent unwanted removal of seal |
| 411 | Side seal tail interlocking features with tank to prevent over insertion of head into tank |
| 412 | Side seal tail pivoting feature |

TABLE 1-continued

| Item Number | Item Description |
|---|---|
| 413 | Side seal embossed label information |
| 414 | Side seal embossed features for identification number for batch and quality |
| 500 | Cap |
| 501 | Cap interlocking features for tank |
| 502 | Cap retaining features for exterior seal |
| 503 | Cap retaining features for interior seal |
| 504 | Cap retaining features for tube |
| 505 | Cap landing features for mouthpiece retaining features |
| 506 | Cap embossed label information |
| 507 | Cap features for compression seal feature with tank |
| 508 | Cap interlocking features with tank to prevent over insertion |
| 509 | Cap vapor exit |
| 510 | Cap landing features to tank |
| 511 | Cap features for ease of installation to tank |
| 512 | Cap embossed features for identification number for batch and quality |
| 600 | Top tube seal from tube to cap |
| 601 | Top tube seal embossed label information |
| 602 | Top tube seal interlocking feature with cap |
| 603 | Top tube seal positional alignment feature with cap |
| 604 | Top tube seal compression faces |
| 605 | Top tube seal double redundant seal feature |
| 606 | Top tube seal embossed features for identification number for batch and quality |
| 700 | Top cap seal from cap to tank |
| 701 | Top cap seal embossed label information |
| 702 | Top cap seal interlocking feature with cap |
| 703 | Top cap seal positional alignment feature with cap |
| 704 | Top cap seal compression faces |
| 705 | Top cap seal double redundant seal feature |
| 706 | Top cap seal embossed features for identification number for batch and quality |
| 800 | Housing chamber for vaporization |
| 801 | Housing embossed label information |
| 802 | Housing unit |
| 803 | Housing interlocking features for electrode center tab |
| 804 | Housing interlocking features for electrode side tab |
| 805 | Housing recess for electrode placement |
| 806 | Housing interlocking features for tube |
| 807 | Housing hard stop feature for tube insertion |
| 808 | Housing interlocking features for tank |
| 809 | Housing alignment features for wick |
| 810 | Housing alignment features for ease installation of vaporizer unit to tank |
| 811 | Housing alignment features for electrode body top |
| 812 | Housing alignment features for electrode body side |
| 813 | Housing vapor exit |
| 814 | Housing fluid entry |
| 815 | Housing embossed features for identification number for batch and quality |
| 900 | Wick |
| 1000 | Coil |
| 1001 | Coil interface with electrode |
| 1002 | Coil with helical spiral configuration |
| 1003 | Coil with single strand configuration |
| 1004 | Coil with cluster strands configuration |
| 1100 | Coil Casing |
| 1101 | Coil casing features for ambient air inlet |
| 1102 | Coil casing features for ambient vapor outlet |
| 1103 | Coil casing features for liquid inlet |
| 1104 | Coil casing slotted features for vapor and airflow |
| 1105 | Coil casing wrap features around coil |
| 1106 | Coil casing circular features for vapor and airflow |
| 1107 | Coil casing internal fin features for heat transfer |
| 1108 | Coil casing external fin features for heat transfer |
| 1109 | Coil casing embossed features for identification number for batch and quality |
| 1200 | Tube |
| 1201 | Tube vapor inlet |
| 1202 | Tube vapor outlet |
| 1203 | Tube embossed features for identification number for batch and quality |
| 1300 | Electrode |
| 1301 | Electrode interface with coil |
| 1302 | Electrode side alignment features for housing |
| 1303 | Electrode top alignment features for housing |
| 1304 | Electrode tab for connection to battery |
| 1400 | Vaporizer unit |
| 1500 | Cartridge unit |
| 1501 | Cartridge ambient air inlet |
| 1502 | Cartridge vapor outlet |
| 1600 | Cartridge casing |
| 1601 | Cartridge casing label information |
| 1602 | Cartridge casing tactile embossment |
| 1603 | Cartridge casing interlock feature for tank |
| 1604 | Cartridge casing interlock feature for tank |
| 1605 | Cartridge casing landing feature for tank |
| 1606 | Cartridge casing embossment for tank seal |
| 1607 | Cartridge casing embossed features for identification number for batch and quality |
| 1700 | Fabric insert |
| 1800 | Cartridge package |
| 1801 | Cartridge package tactile identification with various embossment designs |
| 1900 | Battery and electrical component casing |
| 2000 | Electronic cigarette assembly |
| 2100 | Electronic cigarette casing |
| 2101 | Tactile feel |
| 2200 | Liquid refill bottle |
| 2201 | Liquid refill needle applicator |
| 2300 | gate open diagram gate closed |
| 2400 | seal open diagram seal closed |
| 2500 | refilling operation |
| 3000 | Mouthpiece |
| 3001 | vapor exit channel |
| 3002 | Mouthpiece interlocking features for tank |
| 3003 | mouthpiece interlocking features for upper gasket (L stem) |
| 3004 | mouthpiece interlocking features for upper gasket (below diverter) |
| 3005 | mouthpiece landing alignment features for upper gasket |
| 3006 | mouthpiece relief for tank visibility |
| 3007 | mouthpiece airflow diverter |
| 3008 | mouthpiece recess for tank tab removal |
| 3100 | Tank |
| 3101 | tank interlocking features with mouthpiece |
| 3102 | tank features for vaporizer modular insert |
| 3103 | vaporization chamber |
| 3104 | tank features for tube insert |
| 3105 | tank reservoir for solution |
| 3106 | tank features for wick alignment |
| 3107 | vaporization chamber vapor outlet |
| 3108 | tank fill line indicators |
| 3109 | tank interlocking features with casing |
| 3110 | tank interlocking feature with battery casing |
| 3200 | upper gasket |
| 3201 | compressible seal features |
| 3202 | interlock features with mouthpiece |
| 3203 | alignment features for tube |
| 3204 | landing interface with mouthpiece |
| 3205 | airflow valve |
| 3206 | airflow valve cut or molded features |
| 3300 | modular vaporizer insert |
| 3301 | wire coil |
| 3302 | Wick |
| 3303 | lower gasket |
| 3304 | modular base |
| 3305 | Electrodes |
| 3400 | Tube |

Figure 1:
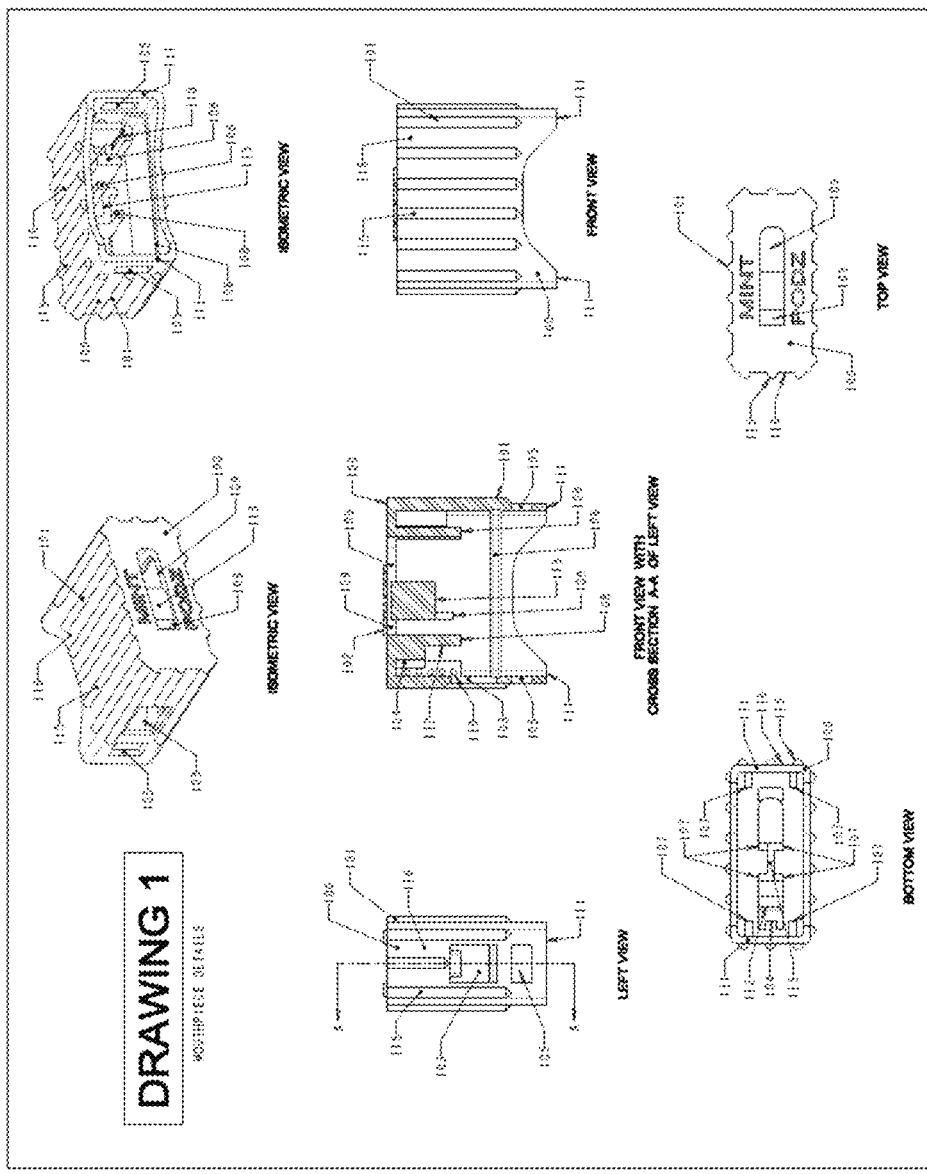
FIG. 1 shows the mouthpiece details and design features.

FIG. 1 details the mouthpiece 100 with various views and several embossment features. The mouthpiece design may contain but is not limited to all of the following features and/or multiple singular features to achieve design intent. The exterior perimeter of the cap has vertical tactile embossments 101 that are pronounced enough to see and feel. To allow the airflow of ambient air into the mouthpiece, the inlet 103 is placed on the side wall of the mouthpiece. The mouthpiece positional interlocking feature 104 retains the airflow gate in place while at the same time allowing the gate to slide vertically without falling inwards. The mouthpiece 100 has a mouthpiece interlocking and positional alignment features for the tank 105. This feature which retains and aligns the mouthpiece to the tank. The mouthpiece 100 also has a secondary mouthpiece interlocking features for the tank 106 which will retain the interior perimeter of mouthpiece to the exterior perimeter of the tank. A mouthpiece retaining features for fabric insert 107 that allows a fabric insert 107 to attach to the mouthpiece 100 and act as a mechanical lock. The mouthpiece retaining features for cap 108 acts as an assembly positional mechanical hard stop and alignment feature for the cap assembly attachment to the mouthpiece 100. The mouthpiece vapor exit channel 109 positioned at the top of the mouthpiece has product marketing, labeling, and serialization information 102 that the consumer can visually see. The face of the variable position interlocking features 110 keeps the airflow gate from falling out of position left or right. The interlocking features 110 on the previous described face are shown with 5 sub flush hemispheres, and may vary in design adjustments to meet design intent. The mouthpiece lower landing feature for the tank 111 allows the mouthpiece 100 lower perimeter rim to snugly settle on the respective mating surface of the tank once interlocking features 105 and 106 have snapped into place. The ambient air passes through the channel and up into the mouthpiece 100 where it comes in contact with the ambient airflow diverter 112. Vapor passes across the vapor airflow diverter 113, which in turn creates an eddy of the vapor. Mouthpiece closed gate locking feature for airflow gate 114 ensures the airflow gate does not slide out of position. The mouthpiece 100 is made of antimicrobial/antibacterial materials 115 and/or biodegradable materials 116 described in detail in a later section of this body of work. Embossments on the inside of the mouthpiece identify the product item with manufacturing information 117 for quality and customer service capabilities. This feature benefits the consumer and marketing as each end cap may have a unique text that can identify the solution inside of the cartridge unit. The novelty of this identification scheme is that the name of the cartridge flavor can correspond to the unique embossments found on the exterior of the mouthpiece. This may allow the consumer to feel and see which flavor is contained within their cartridge unit. As there are limitless liquid solutions that can be put into the cartridge unit there can also be limitless names that can be used and its corresponding limitless embossment design.

Figure 2:
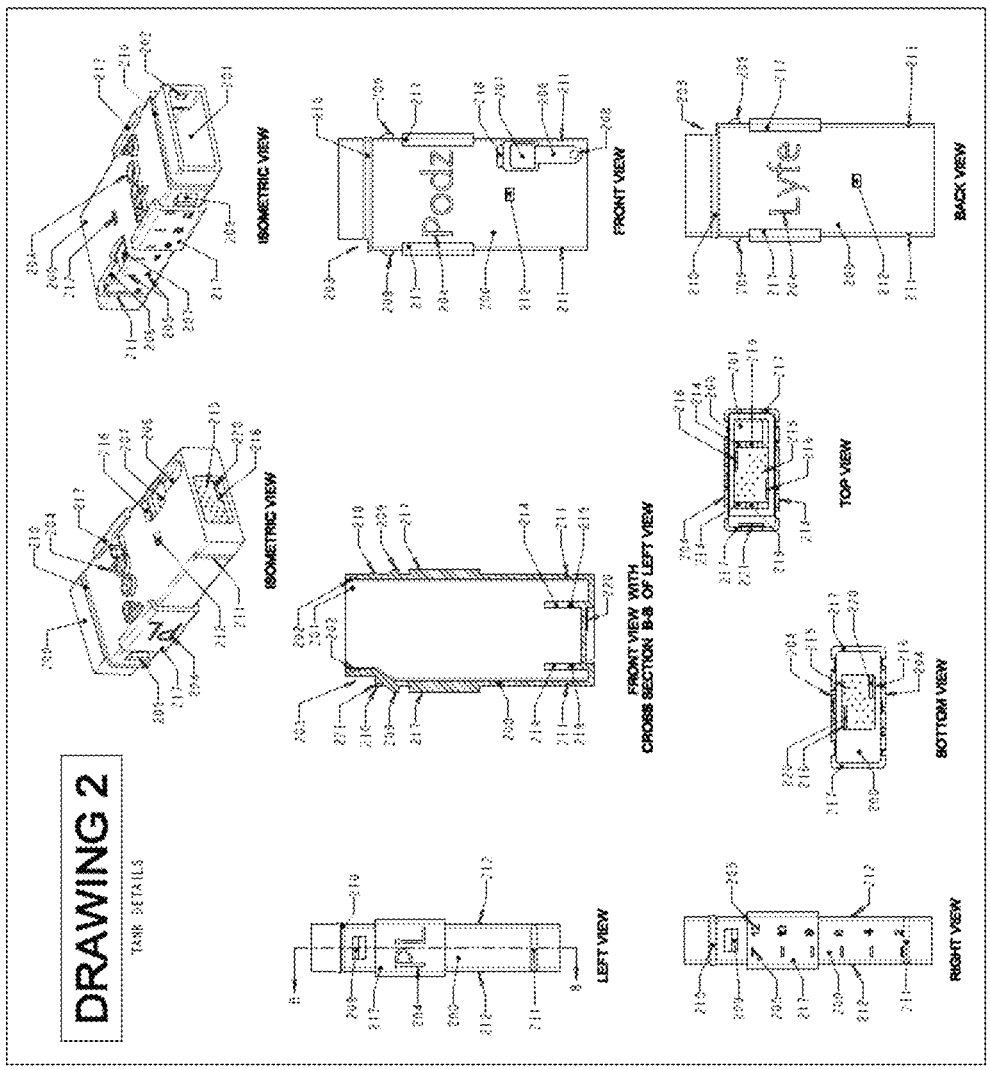
FIG. 2 shows the tank details and design features.
Figure 3:
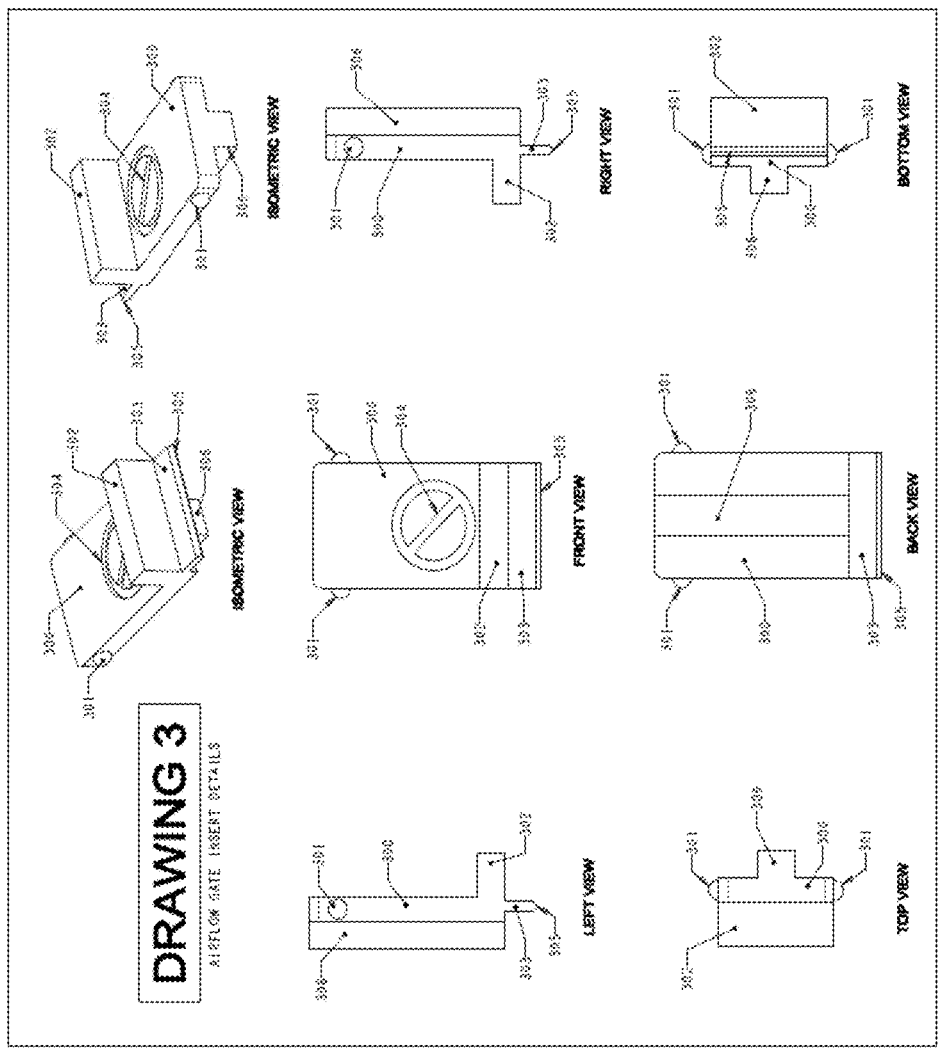
FIG. 3 shows the airflow gate insert details and design features.
Figure 17:
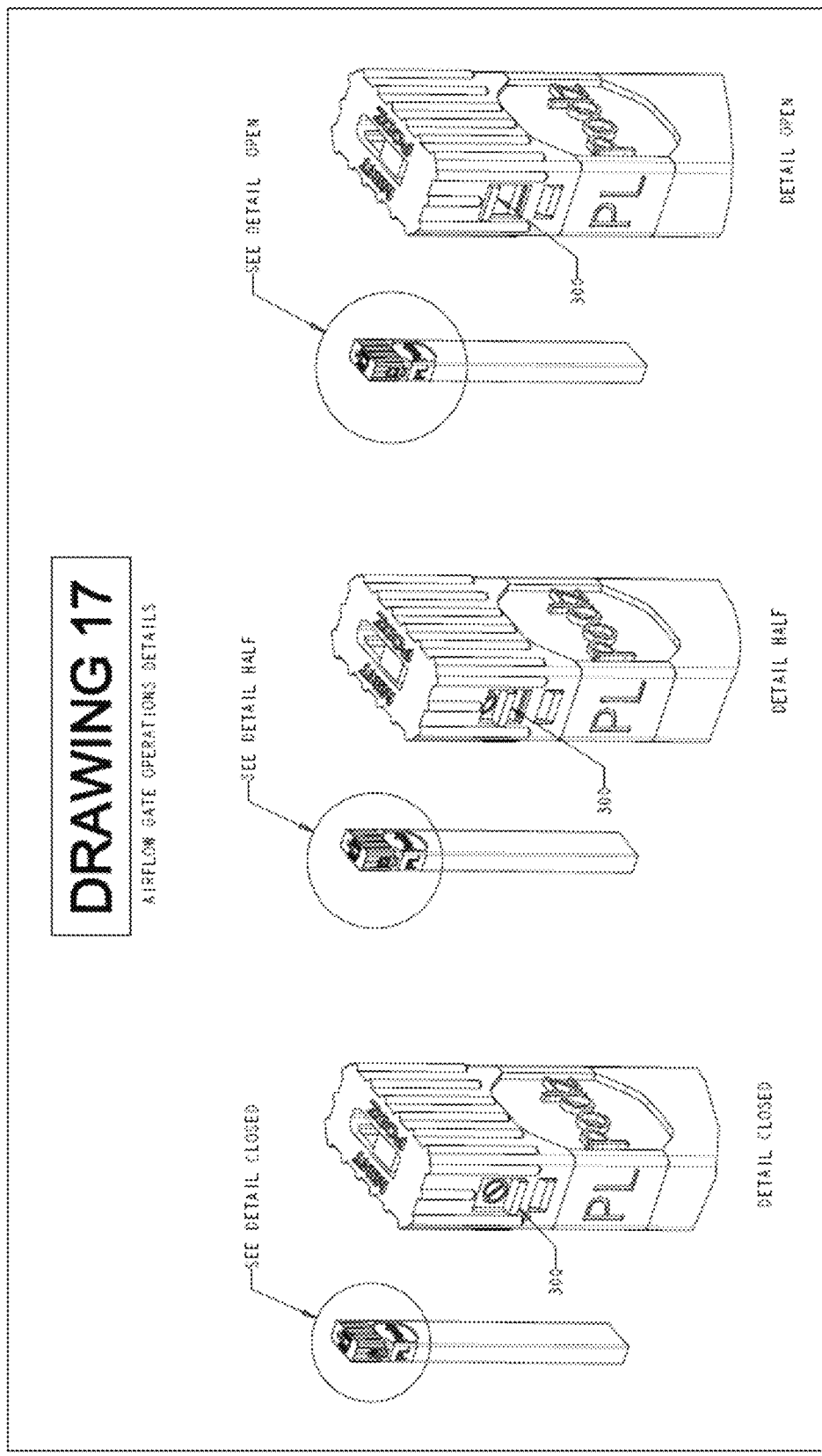
FIG. 17 shows closed, half open, and fully open locking positions of the airflow gate. This allows ambient air to be mixed with the vapor and dilute the vapor to ambient air ratio.

FIG. 2 shows the tank 200 details with many views to highlight the benefits of tactile embossments. The tank design may contain but is not limited to all of the following features and/or multiple singular features to achieve design intent. The tank 200 has a tank top opening 201 that is designed to receive various internal assembly parts which will be aligned in place when the mouthpiece 100 is mated and snapped into place with the tank. The tank top interlocking feature for cap 202 is a mechanical locking feature that will ensure positional alignment the cap can lock into place over the tank 200 upon assembly. The first embossment details are located on the left and right sidewalls. The embossment 217 deviates from the bodylines of the tank in a proud manner that outwards to the relative exterior surfaces of the mouthpiece and battery casing. The front view of FIG. 2 shows a recess in the upper corner of the tank. This recess is for the ambient airflow channel 203. This diverter creates an eddy in the airflow within the center of the mouthpiece. This sets the front and back exterior faces of the tank in relief to the main surfaces of the battery casing and mouthpiece. The product brand has been embossed on the tank faces 204 and this feature may be modified for identification number for batch, quality, serialization, marketing, and/or tracking of product The tank interlocking feature for the mouthpiece 209 and 210 are designed within the tank exterior and will act as a mechanical lock that maintains the position and alignment of the mouthpiece to tank upon assembly. Similarly, there is a tank interlocking feature for the battery casing 211 that ensures that the tank 200 fits snugly into the battery casing while providing mechanical lock that maintains the position and alignment of the cartridge unit within the battery casing. There exists a tank interlocking feature for the pod casing 212 that has a respective mating feature on the pod casing which allows the pod casing and tank 200 to have proper alignment and position while connect snugly for assembly. A tank interlocking feature for the cap 213 allows a cap and the tank 200 to create an interreference fit mechanical lock. In addition, a tank interlocking feature for a housing 214 allows a housing and the tank 200 to connect non-loosely by mating faces creating and interreference fit mechanical lock. A tank ambient air inlet 215 near the base of the tank 200 are ports which allows air to pass into the tank 200. (break into two sentences) A tank electrode pass through 216 near the base of the tank in the vicinity of the tank ambient air inlet 215 allows for next level assembly features to be installed while maintaining position and alignment of next level assembly. A tank feature to position the wick 219 allows a wick to be aligned upon assembly and maintain positional accuracy of assembly process within the tank 200. A tank feature to support bending operation of the electrode 220, located near the base of the tank 200, allows an electrode to be bent during the assembly process without doing damage to the electrode. Embossments on the bottom identify the product with manufacturing information 222 for quality and customer service capabilities. Nevertheless, this space may be used for and not limited to other embossments for marketing and information. The left view shows embossments of the company symbol in relief, nevertheless, this space may also be used for and not limited to other embossments for marketing and information. The right view shows lines and text embossments which become a liquid solution level indicator and correlate the quantity of solution in the tank 205, nevertheless, this space may also be used for and not limited to other embossments for marketing and information. These indicator embossment lines become applicable as the tank is transparent or clear in visibility and color and the remainder of the solution can be quantified FIG. 3 shows the airflow gate insert 300. The airflow gate insert design may contain but is not limited to all of the following features and/or multiple singular features to achieve design intent. The airflow gate has multiple interlocking positions within the mouthpiece 110 and corresponding interlocking features within the airflow gate 301. A tab on the airflow gate 302 assist the consumer with adjusting the airflow gate to the open and closed positions and the positions in between each of those end positions. To prevent the airflow gate from falling inwards into the mouthpiece the airflow gate has and interlocking feature with the tank 303. The main embossment 304 for this piece is a visual cue to the consumer which is displayed as a circle with the line symbol, but is not limited to this sole design. It may also include an identification number for identification number for batch, quality, serialization, marketing, and/or tracking of product. The tip end of the airflow gate interlocking feature has lead in alignment features 305 which allows the airflow gate to self-align its position when engaged with the closed gate interlocking feature 221 found in the tank 200. An airflow gate interlocking alignment feature 306 to the mouthpiece 100 allows the airflow gate insert 300 to attach to the mouthpiece 100 while maintaining slide gap tolerances for consumer adjustments. The purpose of this is to heed warning upon improper refill of the cartridge unit into the mouthpiece instead of the tank. FIG. 17 shows the airflow gate operations. When the gate is closed the symbol becomes visible. When the gate is open the symbol is tucked into the mouthpiece.

Figure 4:
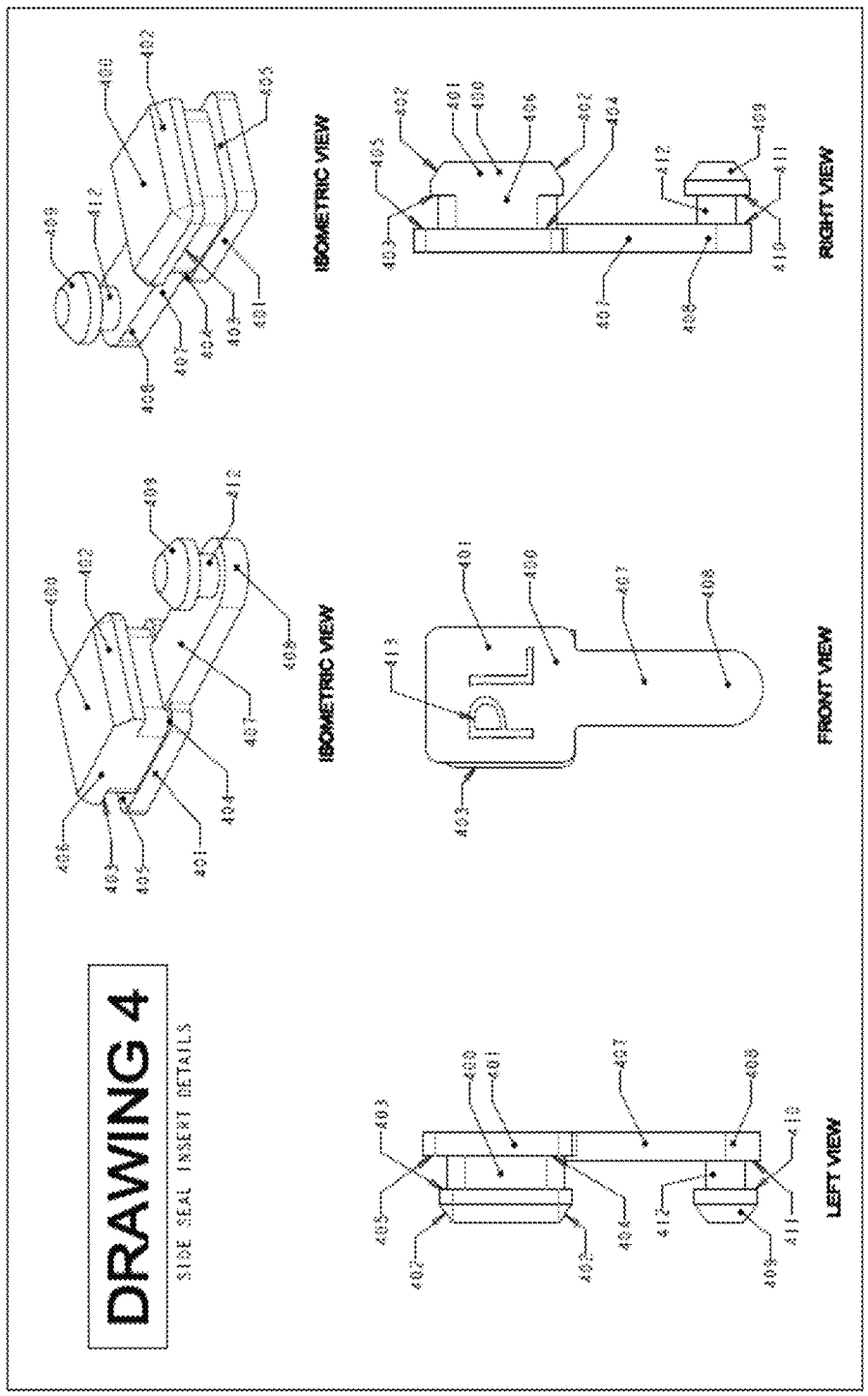
FIG. 4 shows the side seal insert details and design features.

FIG. 4 is various views of the side seal 400. A fingernail or similar thin object is guided by the side seal head removal features 218 underneath the side seal head feature 405 so the consumer can hold onto the side seal head 401. Side seal head alignment and ease of installation features 402 added to the side seal head 401 may assist in this process. A consumer pulls on the side seal head 401 to unlock side seal head features 403 from the tank interlocking features 207. The side seal head and side seal body 407 are then removed from the tank recess 206 and pivoted about the side seal tail pivoting features 412 within the tank interlocking features for side seal tail 208. The side seal tail 408 is designed to remain interlocked to the tank 200 during this pivoting process with interlocking features on the tail 410 and interlocking features on the tank 208. Now that the side seal head is removed from the tank and pivoted out of the way there is clear access to the tank interior. Once the tank is filled with the consumer's desired solution the tank needs to be resealed before use or storage. This is done by pivoting the side seal within the tank using the side seal tail pivoting feature 412 and aligning the side seal head with the opening in the tank. The side seal head is then pressed into place until the features to prevent over insertion 404 are engaged with the tank recess 206. The side seal head may then reengage the side seal head features 403 to interlock the head with the tank. Compression of the seal is critical to preventing leaks and side seal compression features 406 are used to correspond to the tank opening shape and seal compression directions. The side seal is then once again nested flush in the tank recess for the side seal 218 and is ready for usage or storage. The side seal tail 408 also has ease of installation features 409 and an interlocking feature to prevent over insertion 411. These features are utilized at the manufacturing facility. Side seal embossed information 413 is on the face of the side seal head 401, which is used for identification number for batch, quality, serialization, marketing, and/or tracking of product.

Figure 5:
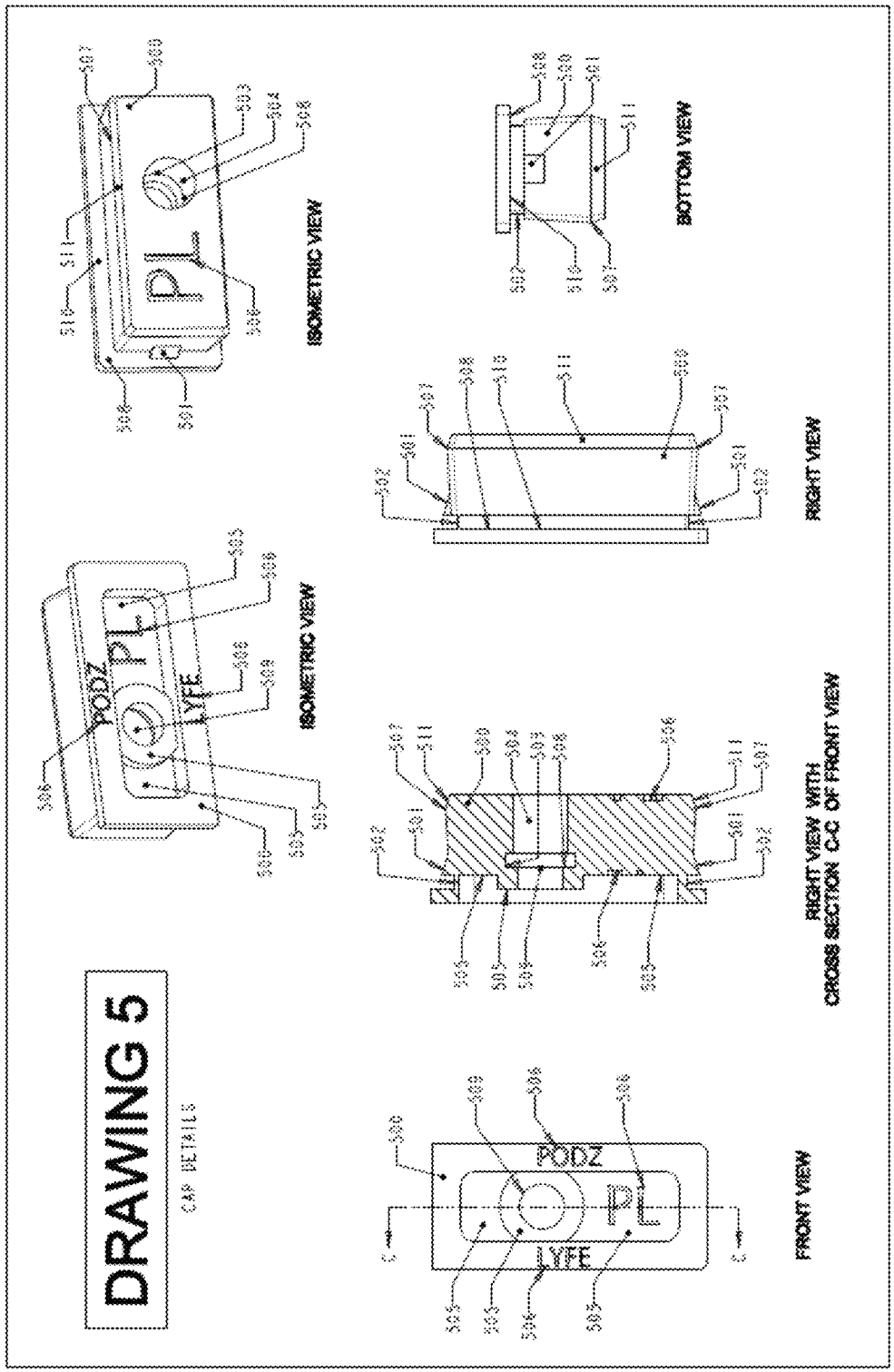
FIG. 5 shows the cap details and design features.

FIG. 5 are various views of the cap 500. The cap design may contain but is not limited to all of the following features and/or multiple singular features to achieve design intent. The cap 500 has a cap interlocking features 501 which serves as a mechanical lock for position and alignment to the tank 200 during assembly. The cap retaining features for the exterior seal 502 are for positional and alignment features for assembly of the exterior seal to the cap. Cap retaining features for interior seal 503 are for positional and alignment features for assembly of the interior seal to the cap. Cap retaining features for tube 504 are designed to position and align the tube with special consideration to allow the assembly to overcome stack up tolerances seen in this area while still maintaining a viable seal. Cap landing features for mouthpiece retaining features 505 are landing sites that correspond to the mouthpiece. These site in conjunction with the corresponding mouthpiece features are for positional and alignment retainment during assembly. Cap embossed label information 506 is for identification number for batch, quality, serialization, marketing, and/or tracking of product. Cap features for compression seal feature with tank 507 are designed to have an interreference compression fit to maintain a perimeter seal with the tank at assembly. Cap interlocking features with tank to prevent over insertion 508 is a mechanical feature that provides an end stop alignment condition at assembly. Cap vapor exit 509 is the pass though feature that allows air and vapor to pass through the part. Cap landing features to tank 510 is the positional and alignment feature that corresponds to mating features on the tank. These features also prevent over insertion during assembly. Cap features for ease of installation to tank 511 are guide features for ease of manufacturing and assembly. Cap embossed features for identification number for batch and quality 512 are for identification number for batch, quality, serialization, marketing, and/or tracking of product.

Figure 6:
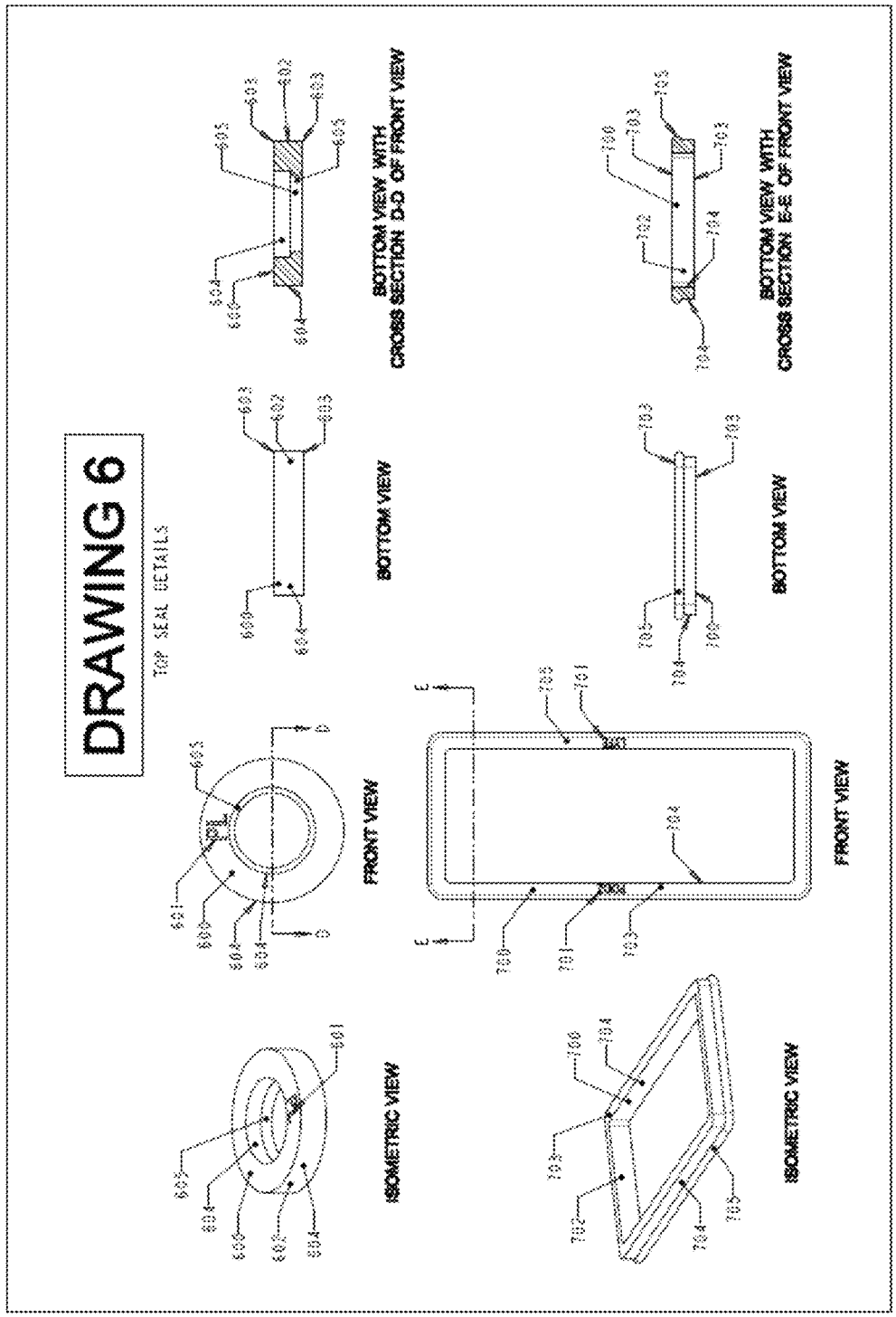
FIG. 6 shows the top seal details and design features.

FIG. 6 shows various views of the top round seal 600. The top round seal design may contain but is not limited to all of the following features and/or multiple singular features to achieve design intent. Top tube seal embossed label information 601 is for identification number for batch, quality, serialization, marketing, and/or tracking of product. Top tube seal interlocking feature with cap 602 is external positional and alignment features within the seal to align for next level assembly. Top tube seal positional alignment feature with cap 603 is external positional and alignment features within the seal to align for next level assembly. Top tube seal compression faces 604 is designed to create an interreference fit within the next level assembly and create a perimeter seal on the interior and exterior of the seal. Top tube seal double redundant seal feature 605 utilizes the diametrical tolerances of the seal in conjunction with the compression of the faces. Top tube seal embossed features for identification number for batch and quality 606 is for identification number for batch, quality, serialization, marketing, and/or tracking of product.

FIG. 6 also shows various views of the top rectangular seal 700. The top rectangular seal design may contain but is not limited to all of the following features and/or multiple singular features to achieve design intent. Top cap seal embossed label information 701 is for identification number for batch, quality, serialization, marketing, and/or tracking of product. Top cap seal interlocking feature with cap 702 is for positional and alignment features that correspond to the tank features. Top cap seal interlocking feature with cap 703 is the landing and retainment feature that corresponds to cap features. In conjunction these features hold the position and alignment of the seal during assembly. Top cap seal compression faces 704 are seal design features which create interreference conditions that create the perimeter seal. Top cap seal double redundant seal feature 705 uses interreference conditions that create the perimeter seal. Top cap seal embossed features for identification number for batch and quality 706 is for identification number for batch, quality, serialization, marketing, and/or tracking of product.

Figure 7:
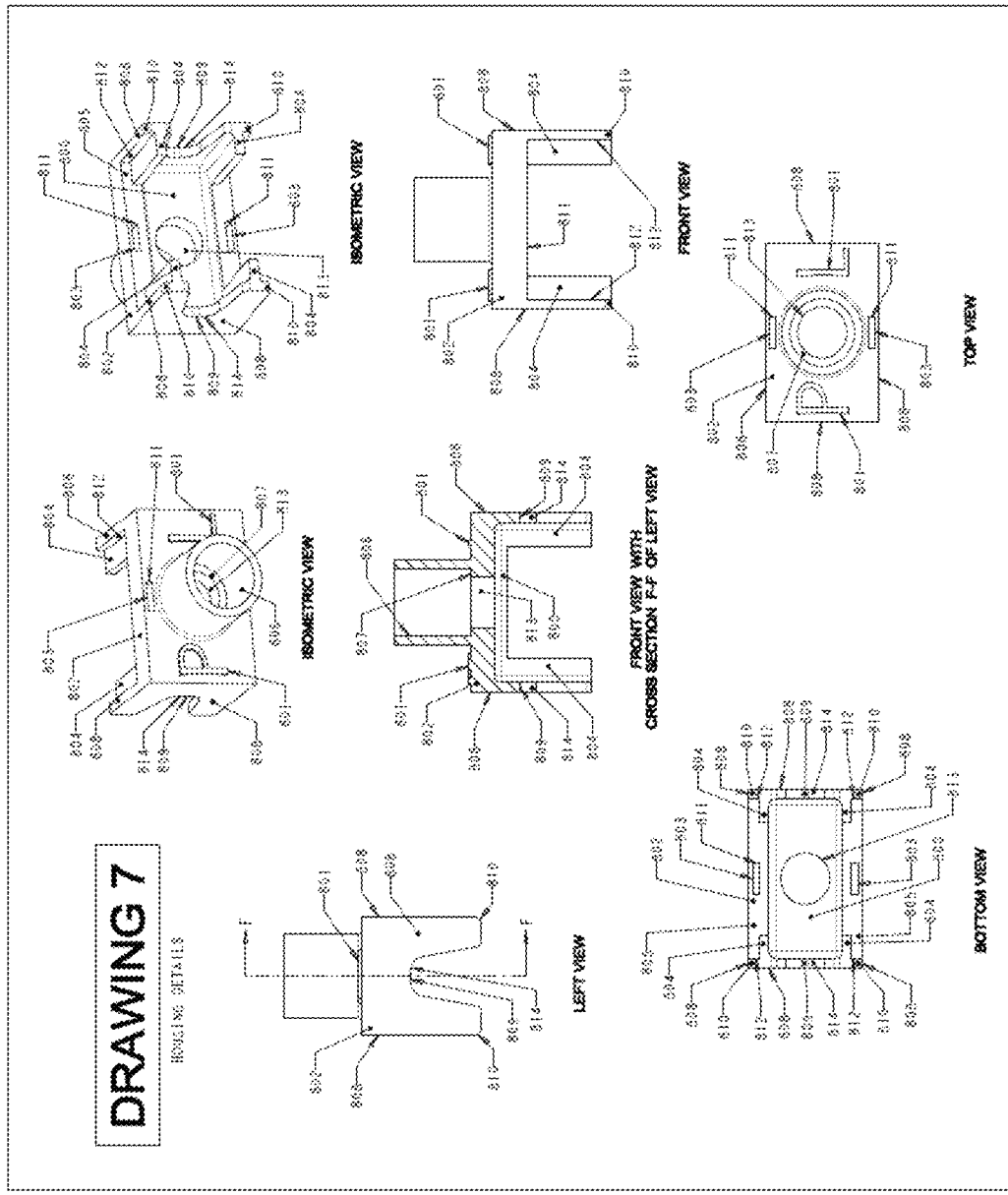
FIG. 7 shows the airflow gate insert details and design features.

FIG. 7 shows various views of the housing detail 800. The housing detail design may contain but is not limited to all of the following features and/or multiple singular features to achieve design intent. Housing embossed label information 801 is for identification number for batch, quality, serialization, marketing, and/or tracking of product. Housing unit 802 is the main body structure of this detail. Housing interlocking features for electrode center tab 803 are positional and alignment features that are utilized to retain parts for next level assembly. Housing interlocking features for electrode side tab 804 are positional and alignment features that are utilized to retain parts for next level assembly.

Housing recess for electrode placement 805 are positional and alignment features that are utilized to retain parts for next level assembly. Housing interlocking features for tube 806 are positional and alignment features that are utilized to retain parts for next level assembly. Housing hard stop feature for tube insertion 807 are positional and alignment features that are utilized to retain parts for next level assembly. Housing interlocking features for tank 808 are features that correspond to receiving tank features positional and alignment features that are utilized to retain parts for next level assembly. Housing alignment features for wick 809 are positional and alignment features that are utilized to retain parts for next level assembly. Housing alignment features for ease installation of vaporizer unit to tank 810 are positional and alignment features that are utilized to retain parts for next level assembly. Housing alignment features for electrode body top 811 are positional and alignment features that are utilized to retain parts for next level assembly. Housing alignment features for electrode body side 812 are positional and alignment features that are utilized to retain parts for next level assembly. Housing vapor exit 813 is a pass though feature at the top of the housing detail. Upon assembly this is the pass-through feature from the vaporization chamber. Housing fluid entry 814 is the direction the wick will pull the fluid into to housing detail for vaporization. Housing embossed features for identification number for batch and quality 815 is for identification number for batch, quality, serialization, marketing, and/or tracking of product.

Figure 8:
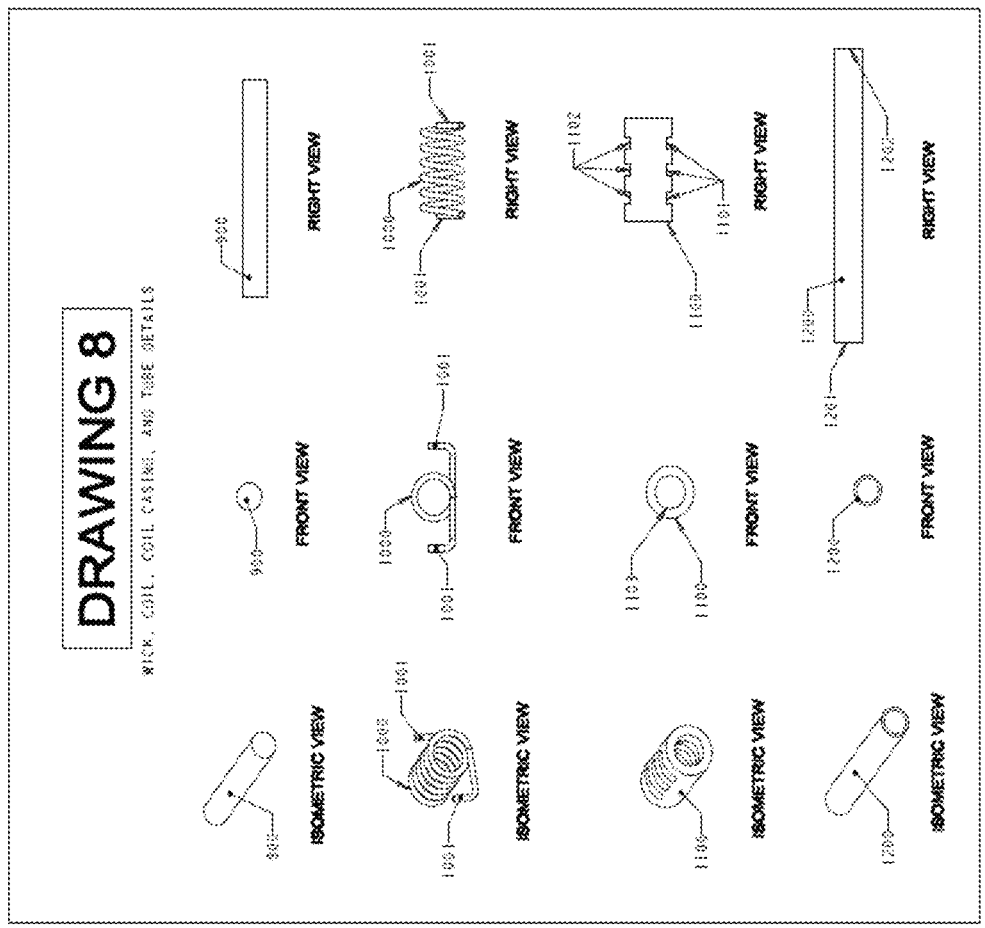
FIG. 8 shows the wick, coil, coil casing, and tube details and design features.

FIG. 8 shows various views of the wick 900. The wick detail design may contain but is not limited to all of the following features and/or multiple singular features to achieve design intent. The wick may consist of a singular or multi stand fiber cut to length to fit the next level assembly.

FIG. 8 also shows various views of the coil 900. The coil detail design may contain but is not limited to all of the following features and/or multiple singular features to achieve design intent. Coil interface with electrode 1001 is for the end crimps to meet next level assembly requirements. Coil with helical spiral configuration 1002 pertains to a coil comprising of but not limited to 6 turns.

In addition, FIG. 8 shows the tube 1200 which will transfer the vapor. The tube design may contain but is not limited to all of the following features and/or multiple singular features to achieve design intent. A circular or rectangular pass through tube containing of one or more vapor inlets 1201 and vapor outlets 1202. The tube may be a standalone unit or may be integrated into surrounding assembly structure. Tube embossed features for identification number for batch and quality 1203 is for identification number for batch, quality, serialization, marketing, and/or tracking of product.

Figure 9:
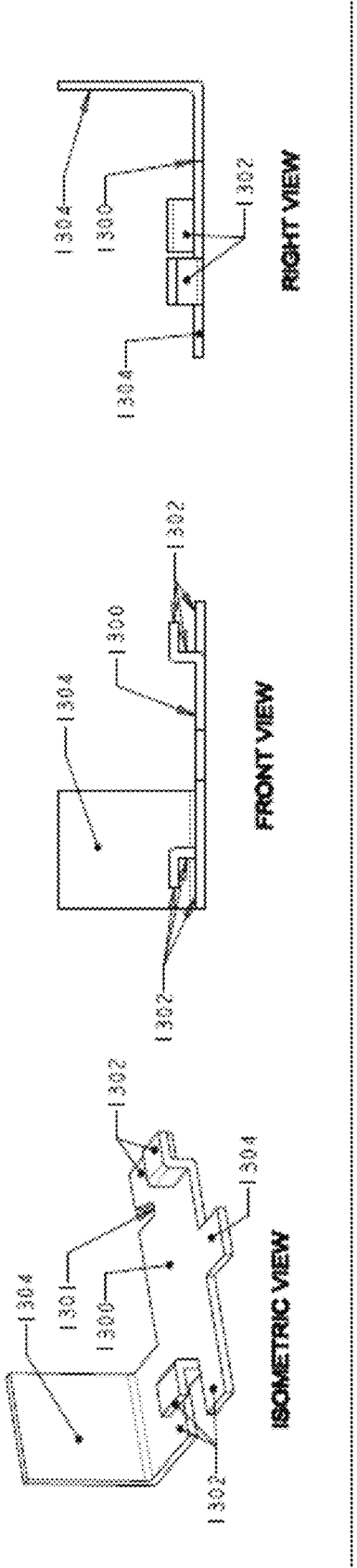
FIG. 9 shows the electrode details and design features.

FIG. 9 shows the electrode 1300 which will transfer the electrical current. The electrode design may contain but is not limited to all of the following features and/or multiple singular features to achieve design intent. The electrode is comprised of a piece metal that is bent and formed to suit the dimension and connections needed for next level assembly position and location retainment. Electrode interface with coil 1301 pertains to one or more retainment features which interface with the coil for electrical current transfer at next level assembly. Electrode side alignment features for housing 1302 pertains to retainment features that control the position and location correspond to next level assembly items. Electrode top alignment features for housing 1303 pertains to retainment features that control the position and location correspond to next level assembly items. Electrode tab for connection to battery 1304 pertains to retainment features that control the position and location correspond to next level assembly items.

Figure 10:
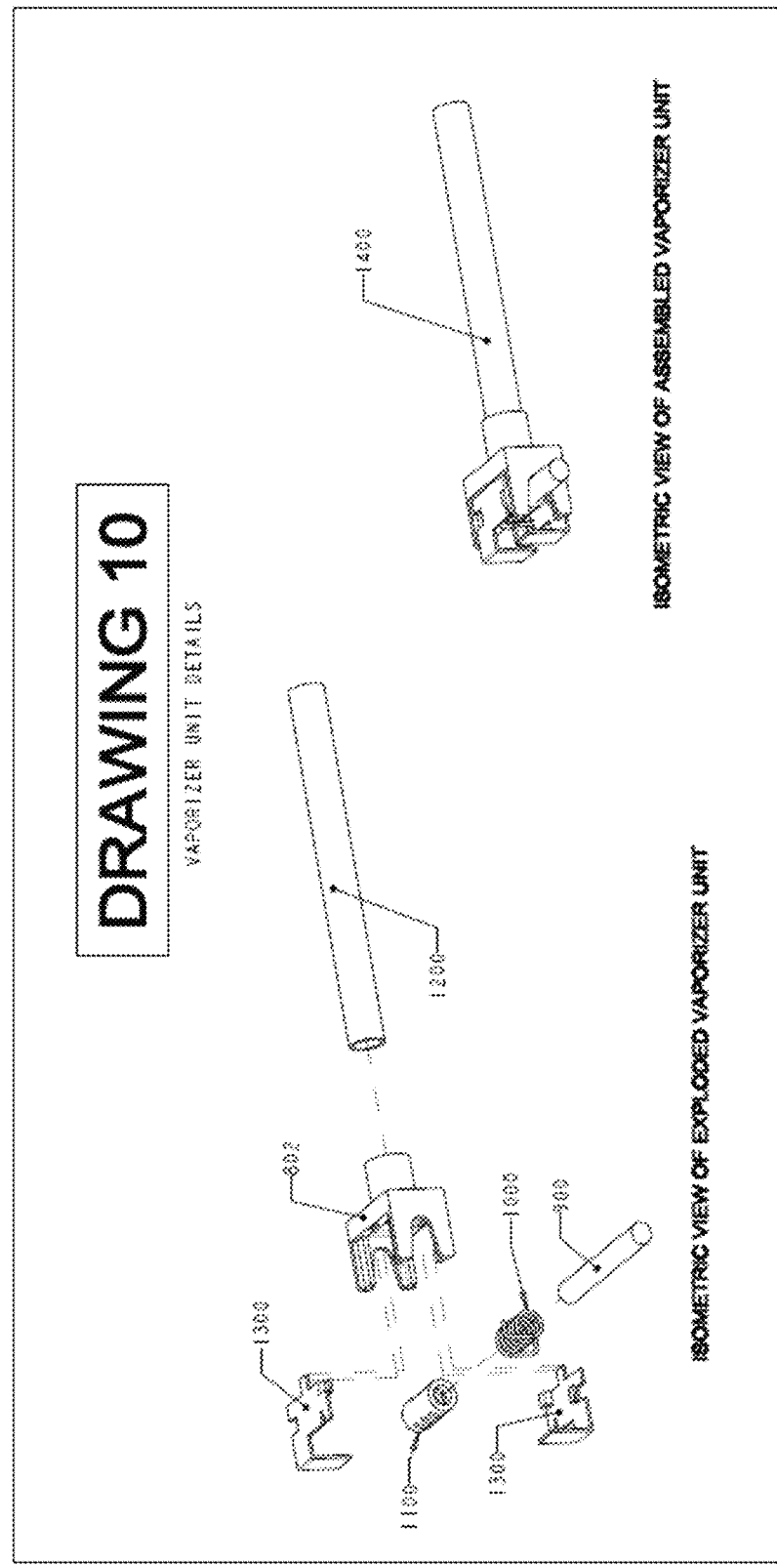
FIG. 10 shows the subcomponents of the vaporizer unit and how they are assembled to form the vaporizer unit.

FIG. 10 shows the vaporizer unit 1400. The vaporizer unit may contain but is not limited to all of the following part bodies, part body configurations, part body features and/or multiple singular features to achieve configuration to meet design intent. The vaporizer unit is comprised of one or more of the following but is not limited to a coil 1000, coil casing 1100, tube 1200, electrode 1300, and wick 900. The unit is assembled via the retainment features, interreference fit, contact fitment, adhesion techniques, soldering techniques, casing techniques, positional techniques, and alignment techniques.

Figure 11:
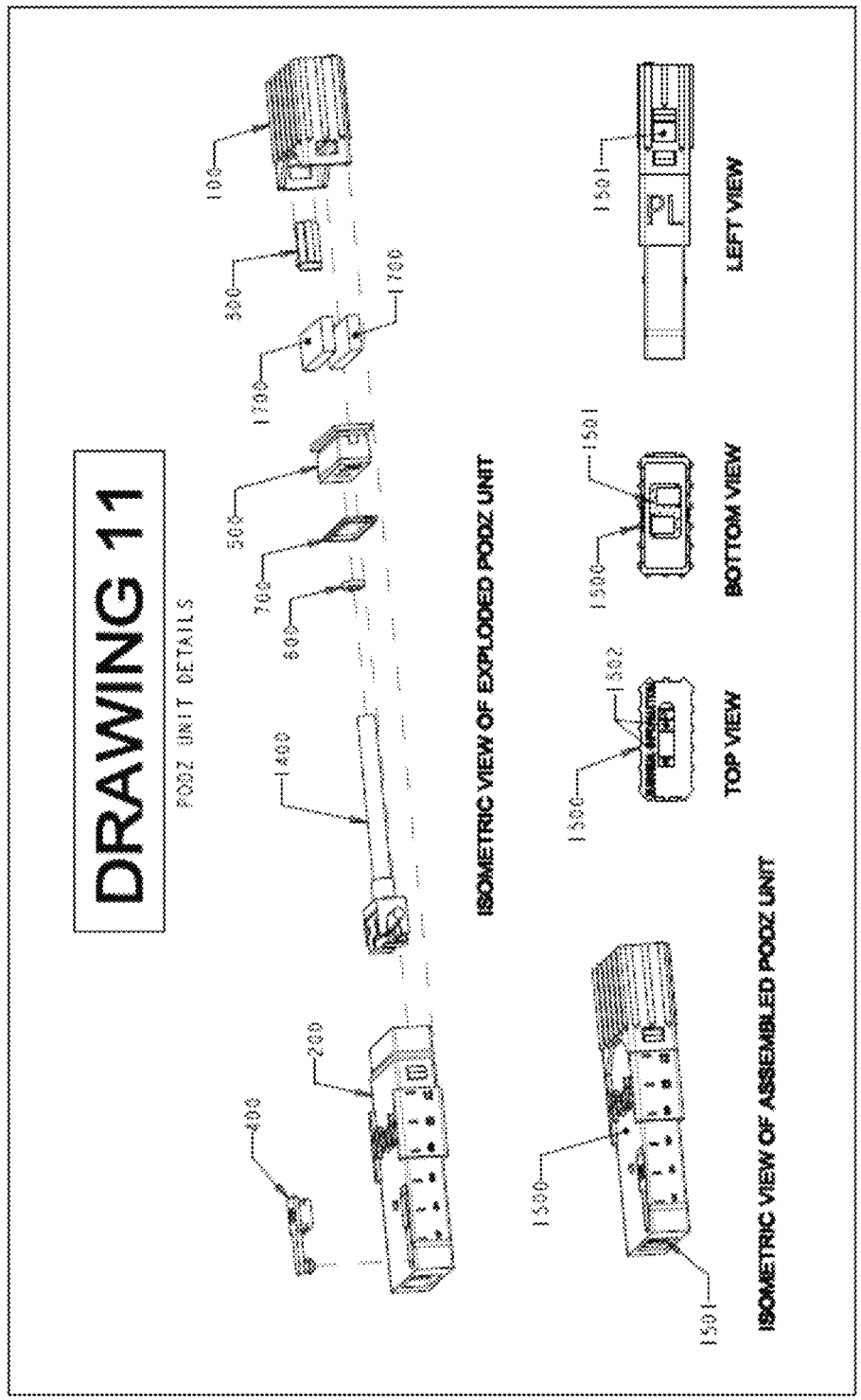
FIG. 11 shows the subcomponents of the cartridge unit and how they are assembled to form the cartridge unit. The direction of ambient airflow into the cartridge unit is shown through the ports on the bottom of the tank and the side of the cartridge unit through the open airflow gate.

FIG. 11 shows the cartridge unit 1500. The vaporizer unit may contain but is not limited to all of the following part bodies, part body configurations, part body features and/or multiple singular features to achieve configuration to meet design intent. The vaporizer unit is comprised of one or more of the following but is not limited to a mouthpiece 100, tank 200, airflow gate insert 300, side seal 400, cap 500, tube top seal from tube to cap 600, Top cap seal from cap to tank 700, vaporizer unit 1400, and fabric insert 1700. The unit is assembled via the retainment features, interreference fit, contact fitment, adhesion techniques, casing techniques, positional techniques, and alignment techniques. Cartridge ambient air inlet 1501 is the port path for ambient air to enter the assembled unit. Cartridge vapor outlet 1502 is the port path for the vapor solution to exit the assembled unit.

Figure 12:
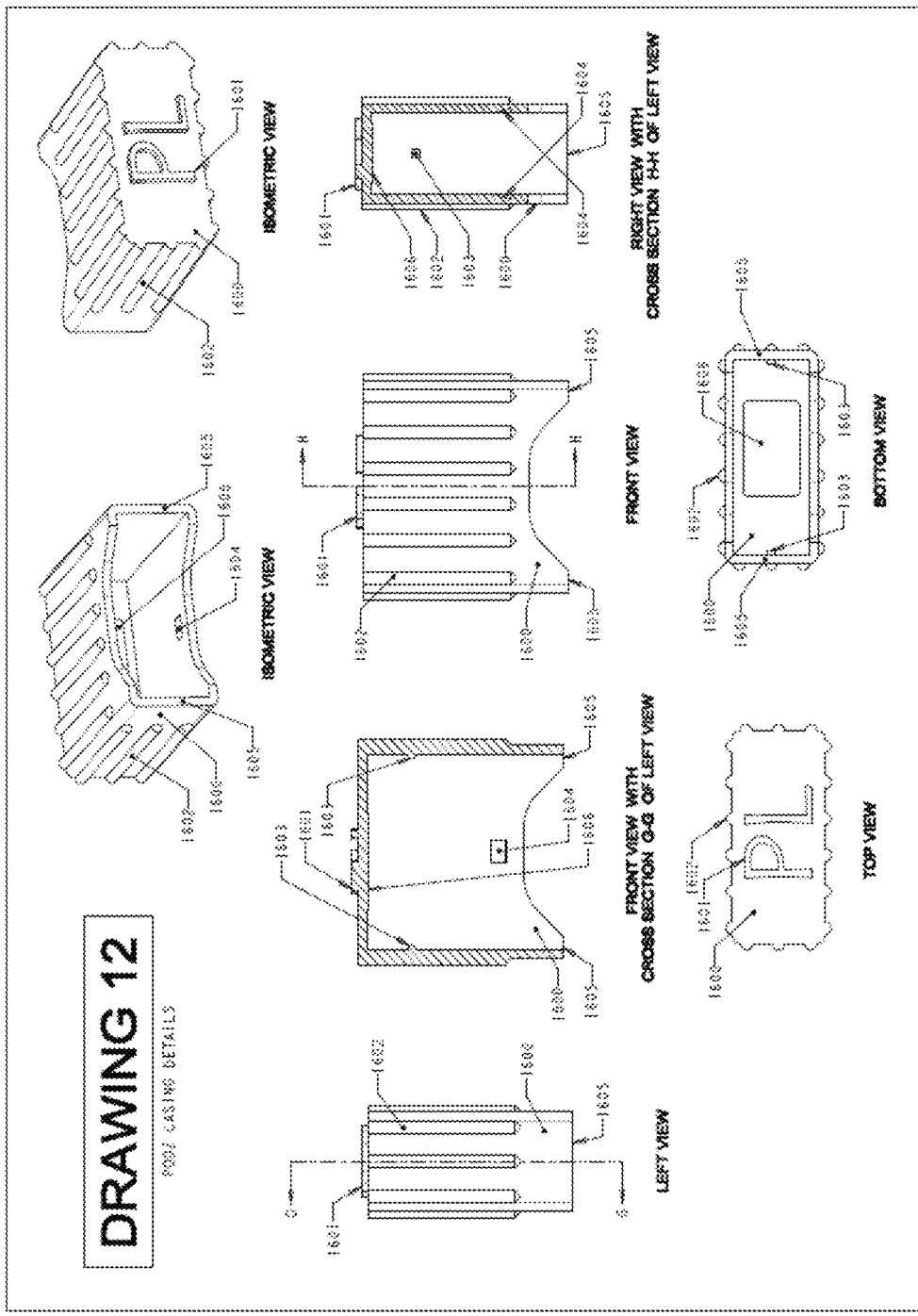
FIG. 12 shows the cartridge casing details and design features.

FIG. 12 shows the cartridge casing 1200 which will protect the exposed portion of the cartridge unit during transport. The cartridge casing design may contain but is not limited to all of the following features and/or multiple singular features to achieve design intent. Cartridge casing label information 1601 is for identification number for batch, quality, serialization, marketing, and/or tracking of product. Cartridge casing tactile embossment 1602 is any perimeter feature that breaks the natural exterior body lines and provides a tactile feel of the cartridge unit when inserted into the battery casing as can be inferred from FIG. 14. Tactile information at this scale must stand out from the natural body lines of the product whereas the consumer can identify the product with the touch of a thumb pad. This situation occurs when the cartridge unit with its corresponding cartridge casing is in the consumers pocket and/or purse or when the consumer wants to know when end the vapor comes out of FIG. 15 shows linear and brail tactile configurations. Other tactile information to include logos and images to correspond to solutions contained within the product. Color coordination of cartridge casing to tactile information will support clearer recognition of solution within the cartridge unit. Cartridge casing interlock feature for tank 1603 is a mechanical locking feature for position and alignment at next level assembly. Cartridge casing interlock feature for tank 1604 is a secondary redundant feature for mechanically locking the casing while providing position and alignment at next level assembly. Cartridge casing embossment for tank seal 1605 is a retainment and alignment feature to protect features of the cartridge unit. Cartridge casing embossment for tank seal 1606 is a hard stop alignment feature for next level assembly. Cartridge casing embossed features for identification number for batch and quality 1607 is for identification number for batch, quality, serialization, marketing, and/or tracking of product.

Figure 13:
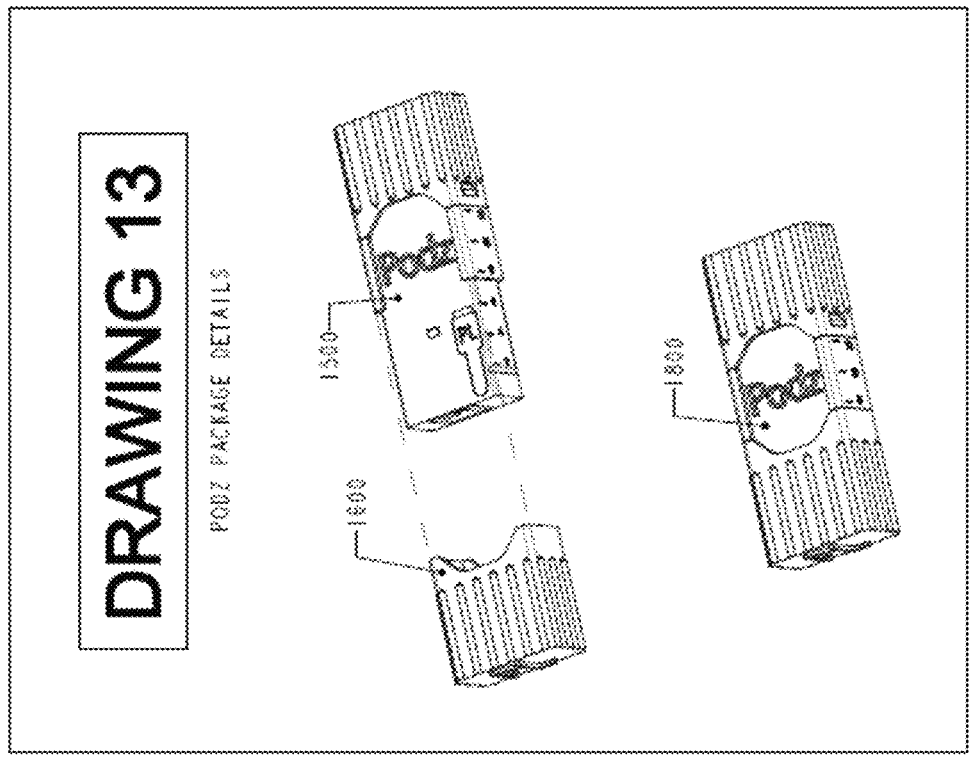
FIG. 13 shows the cartridge casing snapped onto the cartridge unit to form the cartridge package.

FIG. 13 shows the cartridge package 1800. The cartridge package may contain but is not limited to all of the following part bodies, part body configurations, part body features and/or multiple singular features to achieve configuration to meet design intent. The cartridge package is comprised of one or more of the following but is not limited to a cartridge unit 1500, and a cartridge casing 1600. They are assembled via positional, alignment, and mechanical lock features found on the lower level parts.

Figure 14:
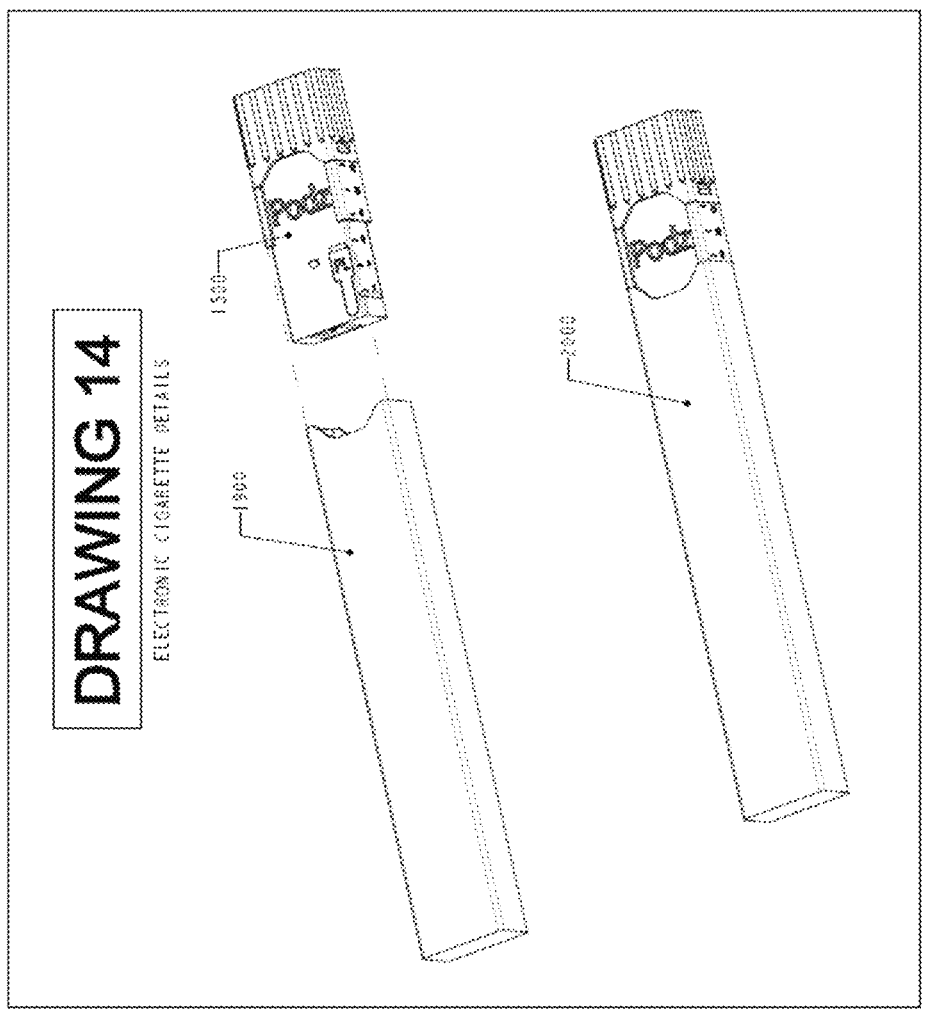
FIG. 14 shows the cartridge unit snapped into the battery and electrical unit casing to form the electronic cigarette assembly
Figure 15:
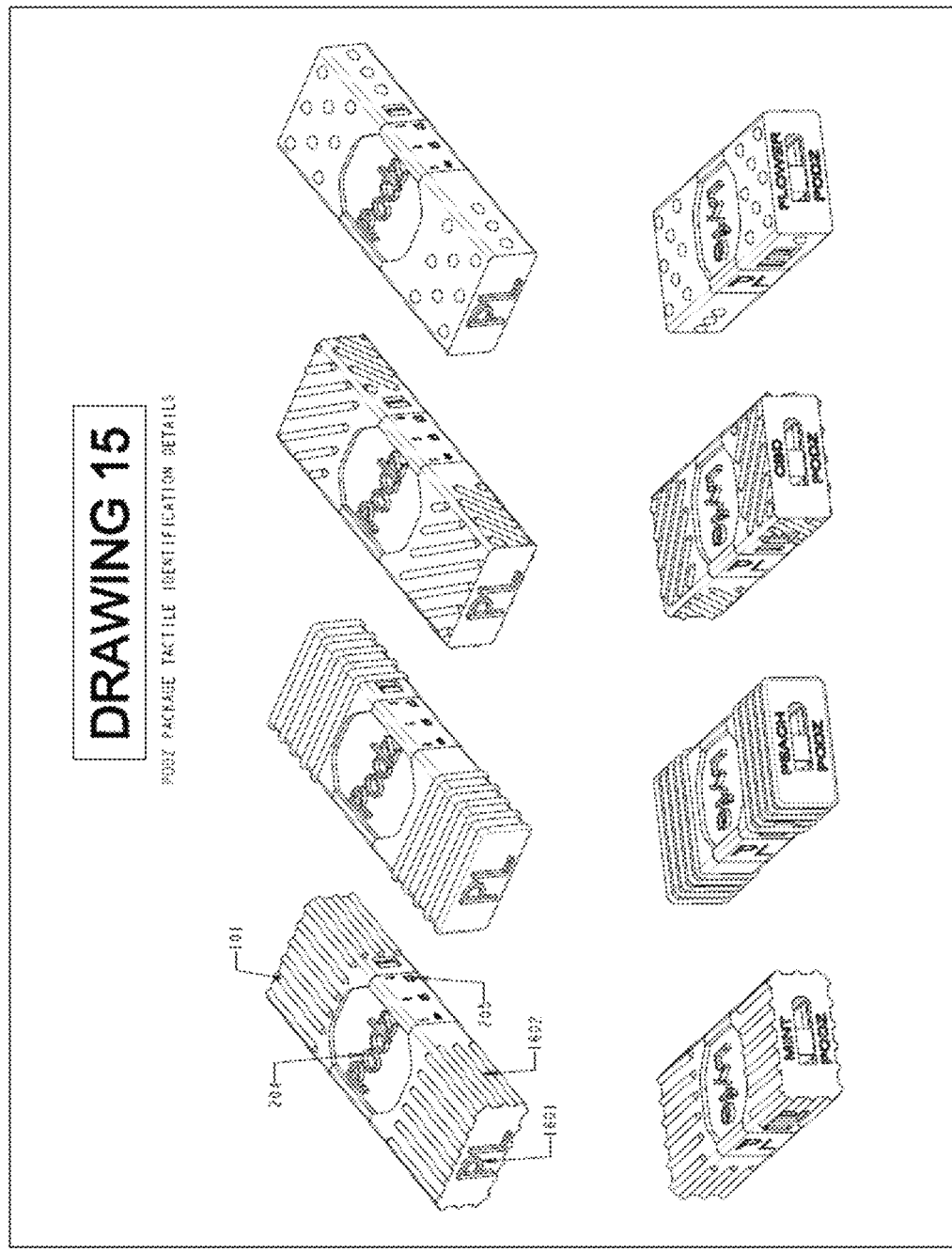
FIG. 15 shows variations of the cartridge package tactile identification details.

FIG. 14 shows the electronic cigarette assembly 2000. The electronic cigarette assembly may contain but is not limited to all of the following part bodies, part body configurations, part body features and/or multiple singular features to achieve configuration to meet design intent. The electronic cigarette is comprised of one or more of the following but is not limited to a cartridge unit 1500 and a battery casing 1900. They are assembled via positional, alignment, and mechanical lock features found on the lower level parts.

FIG. 15 shows four examples of perimeter tactile embossments 1602 that correspond to four different names on the cartridge packages 1800. The examples are replete with cartridge casing label information 1601, tank embossed label information 204, and tank embossed for liquid level indicator 205. The mouthpiece 100 also has a mouthpiece tactile embossment 101. This novel system for identification may greatly support the needs of the consumer. One more additional option for identification that may be used that is not currently on the market is the addition of color coding of the mouthpiece 100 and tank 200.

Figure 16:
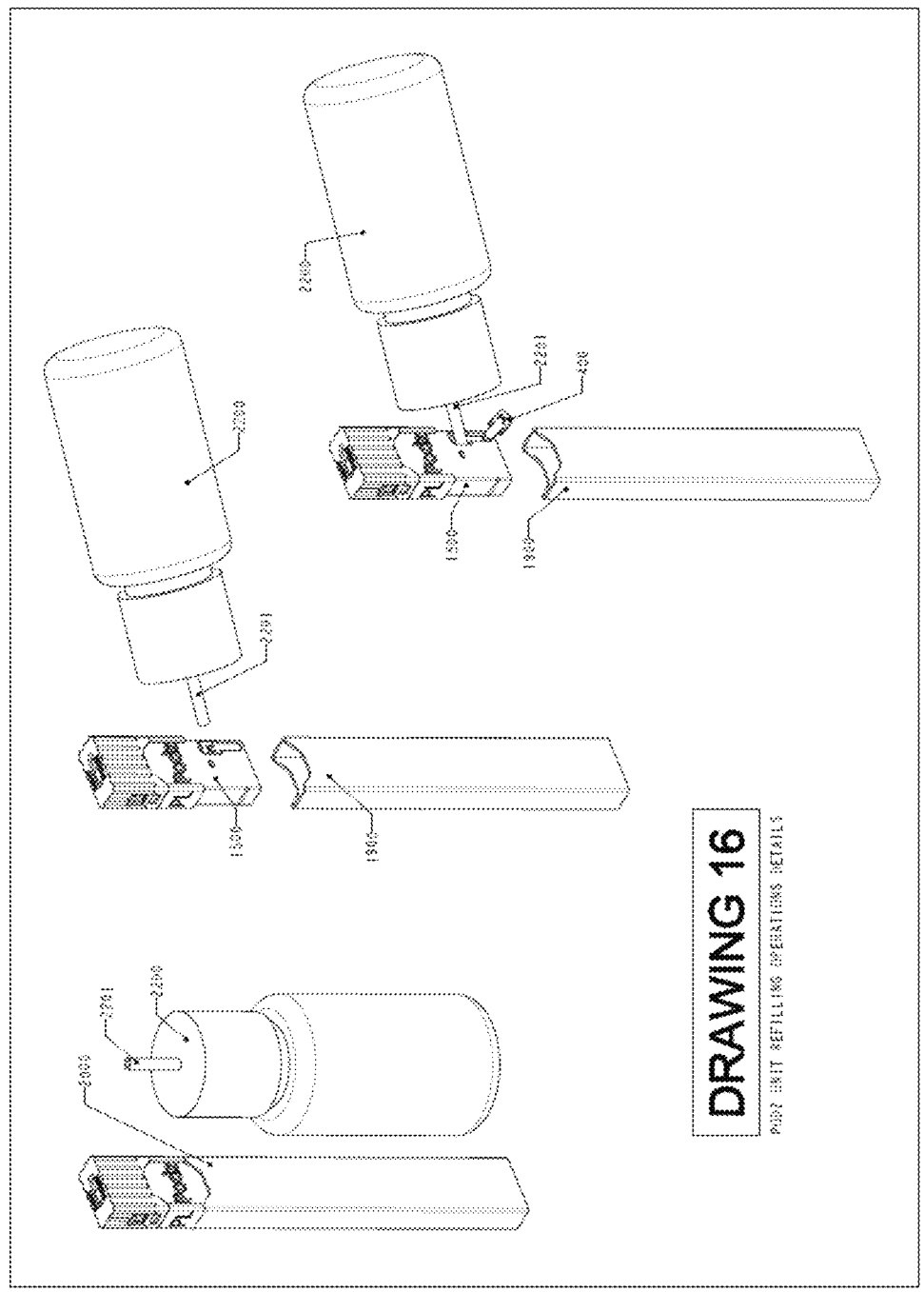
FIG. 16 shows the cartridge unit being removed from the battery and electrical component casing. The side seal is then removed and pivoted out of the way and the needle applicator from the liquid refill bottle is inserted into the cartridge unit to fill the cartridge unit.

FIG. 16 shows the cartridge unit refilling operations. The refilling operations may contain but is not limited to all of the following part bodies, part body configurations, part body features and/or multiple singular features to achieve configuration to meet design intent and operational process intent. A consumer will have a liquid refill bottle 2200 which will be filled with a solution of their choice. This bottle must have a liquid refill needle applicator 2201 which will deliver the liquid solution to the cartridge unit. The cartridge unit 1500 must first be removed from the battery casing 1900 to disassemble the electronic cigarette assembly 2000. The side seal pull tab must be used to pop the head out of the tank. The head will then be rotated to a position where the needle tip applicator can access the tank side seal head feature. It has been observed that the refilling operation work best when the mouthpiece is towards the ground when the solution is put into the tank. This allows gravitational forces to work with the consumer. In addition, the resultant air bubble does not create void pockets. Once the cartridge unit is filled with the solution the consumer can then rotate the side seal head back into place and press it into the tank body. The retainment features in the tank will prevent the user from over inserting the seal into the body.

FIG. 17 shows the cartridge unit refilling operations. The refilling operations may contain but is not limited to all of the following part bodies, part body configurations, part body features and/or multiple singular features to achieve configuration to meet design intent and operational process intent. The airflow gate insert 300 can be adjusted through its various locking positions using a fingernail or similar object against the tab portion. Visual identification features on the airflow gate insert can be recognized by the consumer to see the locked position and prevent accidental insertion of needle tip applicator during the refilling operations to the incorrect location of the cartridge unit. FIG. 17 also shows commonly used settings on the airflow gate which are fully closed, half open, and fully open.

FIG. 18 shows various coil casing configurations 1100. The coil casing design may contain but is not limited to all of the following features and/or multiple singular features to achieve design intent. Coil casing features for ambient air inlet 1101 pertains to the features that allows the inlet airflow to pass into the casing. Coil casing features for ambient vapor outlet 1102 pertains to the features that allows the outlet airflow to pass out of the casing. Coil casing features for liquid inlet 1103 pertains to the features that allows the liquid to pass into the casing. Coil casing slotted features for vapor and airflow 1104 pertains to one or more slots within the casing to increase the airflow rate. Coil casing wrap features around coil 1105 pertains to a feature that wraps the coil itself. Coil casing circular features for vapor and airflow 1106 pertains to one or more pass through holes within the casing to increase the airflow rate. Coil casing internal fin features for heat transfer 1107 pertains to one or more internal fin features. Coil casing external fin features for heat transfer 1108 pertains to one or more external fin features. Coil casing embossed features for identification number for batch and quality 1109 is for identification number for batch, quality, serialization, marketing, and/or tracking of product.

FIG. 19 shows alternative coil designs, one of which is coil with helical spiral configuration 1002. Coil with single strand configuration 1003 pertains to a design where two end hoops with attachment tails for next level assembly are joined with one or more singular rails. These rails may have two or more connections points located at either end or may also have several intermediary mid rail hoop attachments locations which will give the coil a mesh configuration. Coil with cluster strands configuration 1004 pertains to the configuration options described for 1003 with the addition of local clusters for the rail.

FIG. 20 shows the alternative configuration mouthpiece 3000. The mouthpiece design may contain but is not limited to all of the following features and/or multiple singular features to achieve design intent. Vapor exit channel 3001 is for directionally controlled vapor outlet. Mouthpiece interlocking features for tank 3002 is a mechanical lock feature to position, align, and retain the mouthpiece to the tank body during next level assembly. Mouthpiece interlocking features for upper gasket (L stem) 3003 is a mechanical lock feature to position, align, and retain the mouthpiece to the upper gasket during next level assembly. Mouthpiece interlocking features for upper gasket (below diverter) 3004 is a mechanical locking feature which will position, align, and retain the upper gasket during next level assembly. Mouthpiece landing alignment features for upper gasket 3005 is a hard stop landing feature which will position, align, and retain the upper gasket during next level assembly. Mouthpiece relief for tank visibility 3006 is to designate where material is removed so the consumer can check the tank for the quantity of the remaining solution. Mouthpiece airflow diverter 3007 is to bend the vapor exiting the tube which benefits the user experience as direct airflow can tend to be hot. Mouthpiece recess for tank tab removal 3008 is a design feature to allow the consumer to push the tank tabs inward and allow the consumer to easily pull the mouthpiece off for refill operations.

FIG. 21 shows the alternative configuration tank 3100. The tank design may contain but is not limited to all of the following features and/or multiple singular features to achieve design intent. Tank interlocking features with mouthpiece 3101 is a mechanical lock feature to position, align, and retain the mouthpiece to the mouthpiece during next level assembly. Tank features for vaporizer modular insert 3102 is a mechanical lock feature to position, align, and retain the vaporizer insert to the tank during next level assembly. Vaporization chamber 3103 is the area built to convert and the liquid to a vapor. Tank features for tube insert 3104 is a mechanical lock feature to position, align, and retain the vaporizer insert to the tank during next level assembly. Tank reservoir for solution 3105 is the area designated to hold the liquid solution. Tank features for wick alignment 3106 are mechanical lock features to position, align, and retain the vaporizer insert to the tank during next level assembly. Vaporization chamber vapor outlet 3107 is the pass-through feature that allows vapor to exit the vaporization chamber into the tube. Tank fill line indicators 3108 are either interior or exterior features which allow the consumer to visibly see and quantity the remaining liquid in their cartridge unit. These visible indicators will allow the consumer to start to keep metrics on their consumption rate. Tank interlocking features with casing 3109 are mechanical lock features to position, align, and retain the casing to the tank during next level assembly and transportation.

FIG. 22 shows the upper gasket 3200. The upper gasket design may contain but is not limited to all of the following features and/or multiple singular features to achieve design intent. Compressible seal features 3202 are mechanical lock features to seal, position, align, and retain the upper gasket to the mouthpiece during next level assembly. Alignment features for tube 3203 are guide features to seal, position, align, and retain the upper gasket to the mouthpiece during next level assembly. Landing interface with mouthpiece 3204 are mechanical lock features to seal, position, align, and retain the upper gasket to the mouthpiece during next level assembly. Airflow valve 3205 is a mechanical feature to keep the tank from leaking liquid from the cartridge unit when the product is not in use and may be rested on its side or upside down. Airflow valve cut and/or molded features 3206 are one or more features that allow a valve to be formed.

FIG. 23 shows the modular vaporizer insert. The modular vaporizer insert may contain but is not limited to all of the following singular or multiple part bodies, part body configurations, part body features and/or multiple singular features to achieve configuration to meet design intent and operational process intent. Wire coil is 3301 which is a mechanical device used in the vaporization of the liquid and passes through the lower gasket to where the coil tail makes contact with the electrode. Wick 3302 may consist of a singular or multi stand fiber cut to length to fit the next level assembly and draw in liquid to the vaporization chamber. Lower gasket 3303 part body with detailed features which to seal, airflow inlet valve control, positional alignment, mechanically locking, and retain the lower gasket to the tank during assembly. Modular base 3304 is a retaining platform used hold the electrodes and lower gasket. Upon next level assembly to lower gasket and tank the modular base will compress the gasket to create a full body seal of the lower gasket. The modular base has an ambient air inlet port. Electrode 3305 is a metal conductor. The unit is assembled via the retainment features, interreference fit, contact fitment, adhesion techniques, soldering techniques, casing techniques, positional techniques, and alignment techniques.

As the operational use of the cartridge unit within the electronic cigarette grows with time, the modular based cartridge unit design needs to keep up with the limitations of the advancing biodegradable and antimicrobial technology. This can be achieved with the plug and play modular concept shown in FIG. 24. The common issues with widely used biodegradable technology is the lack of thermal resistance before creep and degradation. The vaporization chamber modular insert 3300 which sees high temperatures is made out thermal resistant high temp materials. The chemical composition of these high temp materials which will take longer to biodegrade than other bodies that do not need thermal resistance such as the 3100 tank and/or mouthpiece 3100. This local material optimization will promote the largest mass items of the cartridge unit to biodegrade as fast as possible.

Additional design benefits arrive from these features in the assembled cartridge unit. When the consumer draws vapor from their electronic cigarette, ambient air can also flow through the open airflow gate 300 and cross the threshold to the interior of the mouthpiece 100. The tank has detailed features that are critical to the ease of use, durability, and manufacturing process of the airflow gate mechanism. The ambient air path is critical in airflow analysis and the airflow is immediately guided by the tank 200 once it passes through the side airflow gate 300. At the same time vapor exits the vapor tube outlet 1202 and passes across the vapor airflow diverter 113, which in turn creates an eddy of the vapor. The swirling ambient air mixes with the swirling vapor. The diluted vapor then heads towards the vapor exit channel 109 out of the mouthpiece and into the consumer's mouth.

A side mounted opening within the tank 200 and a side seal 400 mechanism allows the consumer to reuse their disposable cartridge unit 1500.

A problem for consumers of cartridge units arises frequently when the consumer goes to inhale vapor from their product and unknowingly sucks on the wrong end of the electronic cigarette instead of the mouthpiece. This problem is then magnified in dark settings where the user cannot easily visually distinguish which end contains the mouthpiece and the product can be repeatedly used improperly. The added embossed features to the mouthpiece 100, tank 200, cartridge casing 1600, and all other items contained within the cartridge package 1800 address this problem. None of these features currently exists on the mouthpiece, 100 tank 200, cartridge casing 1600, or vaporizer unit 1400 as a singular item. None of these features exist as a pod unit or when combined into a cartridge packages 1800. None of these features exist in the electronic cigarette assembly 2000 when the cartridge unit 1500 is inserted into body of the battery casing. The introduction of this embossment design opens up significant benefits for the consumers, manufacturers, distributors, and marketers, quality and customer service of the product.

The embossment provides identifying features and information by visual or tactile sensation that prevents the consumer wondering which brand, flavor, and the quantity of solution consumed. The lack of identifying information can inhibit the manufacturer from knowing which batch or product the consumer is using if there are quality issues. The lack of information hinders the marketing aspect of the product as the "brand" is not displayed, which is addressed by the embossment.

A measurement scheme for the quantity of solution in cartridge unit 1500 in an electronic cigarette 2000 has not been done before. In the form of tank fill line indicators 3108, this new measurement scheme on the tank 200 allows the consumer to quantify the amount of solution they are vaporizing. This opens the door to quantitative analysis and allows the consumer to properly dose themselves for a given time period while reducing the risk of over and under dosing. Repeated usage of these dosage indicators may educate the consumer on intake quantity and duration. This increased knowledge by the consumer may allow manufactures to vary the size of their tanks to meet the dosage requirements of their consumers. This may give marketing more information about their consumers so they target the correct demographics per dosage requirements. The measurement lines also assist with refilling operations. Single or multiple solutions may be used in a single tank with direct application from the refill bottle all while eliminating the use of an intermediate syringe to measure volumetric quantities.

New and improving material technology in each of the individual components within a cartridge package 1800 may benefit from a tracking scheme that allows each batch of components to be identified and recorded for quality purposes. Current components on the market within the cartridge package 1800 are not identified with a part number, batch number, serial number, or any identification information. The batch which identifies when the component was fabricated may be very important for the lifespan and use of the products covered within this disclosure.

This embossments features for which are described by but not limit to identification of part number, batch number, or serial number are found on the mouthpiece 117, tank 222, airflow gate 307, side seal 414, cap 512, top tube seal 606, top cap seal 706, housing 815, coil casing 1109, tube 1203, cartridge casing 1607, and modular insert 3300. These identifying features of products allows the manufactures to evaluate the new material selection directed to address: (i) lack of biodegradable and compostable resin fillers; and (ii) protection from microorganisms that can be orally transferred to consumers of the product.

Current components of the cartridge packages 1600 on the market are generally fabricated from non-biodegradable petroleum based polymers such as Polyethylene (PE), Polyethylene terephthalate (PET), and Polypropylene (PP) commonly referred to as commodity plastics. Engineered plastics and resins are not currently used in this industry and marketplace as they increase the cost of the product and the demand for cleaner waste products does not exist yet. Nevertheless, engineered plastics that are bioplastics or have biodegradable and compostable properties present the benefit of a durable product that is environmentally friendly. This early shift in the electronic cigarette market may steer the industry to a more environmentally benign cartridge package 1800.

A first material technology method is to alter the chemistry of commodity plastics by adding in fillers that may lower the molecular weight of the resin base used to manufacture the product. Lowering the molecular weight makes it easier for the microbes to break down the plastic faster and allow it to biodegrade faster. There are several fillers available on the market that can be added to commodity plastics used in electronic cigarettes to achieve this new goal.

A second material technology method is to fabricate the components of the cartridge package out of bioplastics which are fabricated from organic biomass and other renewable resources rather than petroleum. These bioplastics can be used singularly or blended. The new material selection include but are not limited to polylactic acid (PLA), high temperature polylactic acid (HTPLA), furandicarbonylic acid (FDCA), polyhydroxyalkanoates (PHA), polyhydroxybutyrate (PHB), poly-3-hydroxybutyrate (P3HB), poly-4-hydroxybutyrate (P4HB), polyhydroxyvalerate (PHV), polyhydroxyhexanoate (PHH), polyhydroxyoctanoate (PHO), (and the other copolymers and monomers of PHA) polybutylene succinate (PBS), polyethylene succinate (PES), polypropiolactone (PPL), polypropiolactone high molecular weight (PPL-HMW), polycaprolactone (PCL), polyethylene adipate (PEA), polyethylene azelate (PEAz), polyethylene suberate (PEsu), polyethylene sebacate (PESE), polyethylene decamethylate (PEDe), polybutylene adipate (PBA), aliphatic-aromatic copolyesters (AAC), acetyl cellulose (AcC) and other common starch, cellulose, and protein based plastics.

There are several methods for incorporating antimicrobial/antibacterial technology to the mouthpiece while maintaining mechanical, thermal, and barrier properties needed for regular product use. Such methods assist in eliminating microorganisms from being transferred to the mouthpiece and minimize the spread of bacteria and viruses. One method is to add antimicrobial/antibacterial fillers to the raw biodegradable and compostable plastic through melt intercalation to form a polymer blend for the entire product. Another method is to use solvent casting to achieve an antimicrobial/antibacterial nanocomposite film. Yet another method is to use an overmold casting method of the antimicrobial/antibacterial agent to the mouthpiece. A fourth method is a hot press method of the antimicrobial/antibacterial agent to the mouthpiece. A fifth method is to heat shrink the antimicrobial/antibacterial film to the mouthpiece. A sixth method is supercritical impregnation of antimicrobial/antibacterial agent to the mouthpiece. Electrospinning is yet another method. Plasma treatment followed by immersion processes as necessary is yet another method. Each of these methods is critical to the specific biodegradable and compostable plastic and its respective chemistry composition. These processes will produce the antimicrobial/antibacterial barrier found within the mouthpiece. The process itself is key to achieving effective antimicrobial activity of the product. As the product chemistry evolves and improves with the application method will follow suit to ensure the proper barrier is built for the product.

The materials used to make the antimicrobial film include, but are not limited to, metals, essential oils, natural compounds, peptides, antibiotics, chelating agents, chitosan, other polymers, bioactive polymers, biopassive polymers, enzymes, silica, nisin, polyhexamethylene guanidine hydrochloride, starch, Ethyl-Na-dodecanoyl-L-arginate, caseinates, nanofillers, ethyl cellulose, and combinations of these materials.

When casing material is ceramic, this product tends to negatively alter the taste of the liquid solution, adds a ceramic taste. To combat burnt taste and evenly distribute heat distribution by encasing their coils with a casing, antimicrobial/antibacterial fillers may be added to the raw plastic before it is injection molded to take the shape of the mouthpiece. This creates a mouthpiece that benefits from built in technology that may eliminate microorganisms that are transferred to it. Other methods for application of antimicrobial/antibacterial protection include the use of wrapping the mouthpiece post injection mold operations; and the use of an antimicrobial sticker which would protect the entire mouthpiece. Other options would be a coating spray of antimicrobial/antibacterial protection post injection mold operations. Antimicrobial/antibacterial protection is amenable with the biodegradable and compostable items/components of the systems and methods herein.

The design interfaces of the airflow gate 300 and the surrounding components are critical to the ease of use, durability, and manufacturing process of the airflow gate mechanism. This ensures the consumer does not put their lips over the inlet and block the ambient air and inhibit the dilution the vapor solution. These are not limited to hemisphere design as they may be ribbed as well, or other designs of an interlocking nature. They are also not limited to the count of 5. Nevertheless, the interlocking feature 301 must match the design on the airflow gate 300. With these positional interlocking features the gate 300 can now slide in the vertical direction start from the closed position and ending at the open position. The fully closed position is not a trivial feature as it needs to be retained in the position if exterior forces press the gate inwards. This would be the case of something poking it, such as a consumer trying to refill the cartridge unit with a refill bottle 2200 in the incorrect location. These features ensure that after repeated use of the product the gate has the best opportunity to not break due to normal uses of the product.

OTHER EMBODIMENTS

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims.

What is claimed is:

1. An apparatus comprising:
    a cartridge unit the cartridge unit further comprising:
        a mouthpiece;
        an airflow insert gate inserted into the mouthpiece;
        a fabric insert within the mouthpiece;
        a cap that rests near a distal end of the mouthpiece;
        a top cap seal from cap to tank that rests on the cap;
        a top tube seal from tube to cap;
        a vaporizer unit that is encircled by the top tube seal from tube to cap, the vaporizer unit further comprising:
            a tube;
            a housing unit that connects with the tube;
            a coil casing that is housed within the housing;
            a wick that is encircled by the coil casing;
            a coil that encircles the wick; and
            an electrode that rests on the housing; and
        a tank that the vaporizer unit is positioned within;
        a side seal that rests on an outer surface of the tank; and
        a battery and electrical component casing that connects to the cartridge unit.

2. The apparatus of claim 1, wherein the coil casing is selected from the group consisting of slotted features, wrap features, circular features, internal fins, and external fins.

3. The apparatus of claim 1, wherein the coil is selected from the group consisting of spiral coil, single strand coil, and cluster coil.

\* \* \* \* \*